United States Patent

[11] 3,625,261

[72] Inventors: Donald E. Hill, Fort Wayne; Stanley D. Payne, Fort Wayne, Ind.; Robert G. Walker, Brighton, Mich.
[21] Appl. No. 845,804
[22] Filed July 29, 1969
[45] Patented Dec. 7, 1971
[73] Assignee Industra Products Inc., Fort Wayne, Ind.

[54] APPARATUS FOR WINDING AND PLACING COILS IN THE SLOTS OF A STATOR
21 Claims, 31 Drawing Figs.
[52] U.S. Cl. .................. 140/92.1, 29/205 D, 29/596
[51] Int. Cl. .................. H02k 15/00, B21f 3/04
[50] Field of Search .................. 140/1, 92.1, 92.2; 29/596, 605, 205

[56] References Cited
UNITED STATES PATENTS
3,557,432 1/1971 Pavesi .................. 140/92.2
3,522,650 8/1970 Cutler et al. .................. 140/92.1

Primary Examiner—Lowell A. Larson
Attorney—Koenig, Senniger, Powers and Leavitt

ABSTRACT: Apparatus for winding and placing coils in the slots of a stator comprising a rotary index table carrying three sets of placer fingers spaced at 120° intervals, each set being adapted to hold a plurality of pole windings for a stator. The table is adapted to be indexed successively to bring each set of placer fingers from a first winding station to a second winding station, thence to a placing station, and thence back to the first winding station, with a dwell at each station. At each of the winding stations, there is provided a coil winding and transfer mechanism including a coil form, a flyer for winding coils on the coil form, and means for transferring coils from the coil form to the set of placer fingers at the respective winding station. Each set of placer fingers is indexable during its dwell at each winding station for reception of successive sets of coils in proper position for placement of the coils in the stator. After the winding of coils and their transfer to the set of fingers at the first winding station, the table is indexed to bring this set of fingers with the coils thereon to the second winding station. After the winding of additional coils and their transfer to the set of fingers at the second winding station, the table is indexed to bring the set of fingers with the coils thereon to the placing station, where a stator is placed on the fingers and the coils are pushed into the slots of the stator. The stator with the coils in its slots is then removed, and the table indexed to bring the set of fingers to the first winding station to start another cycle.

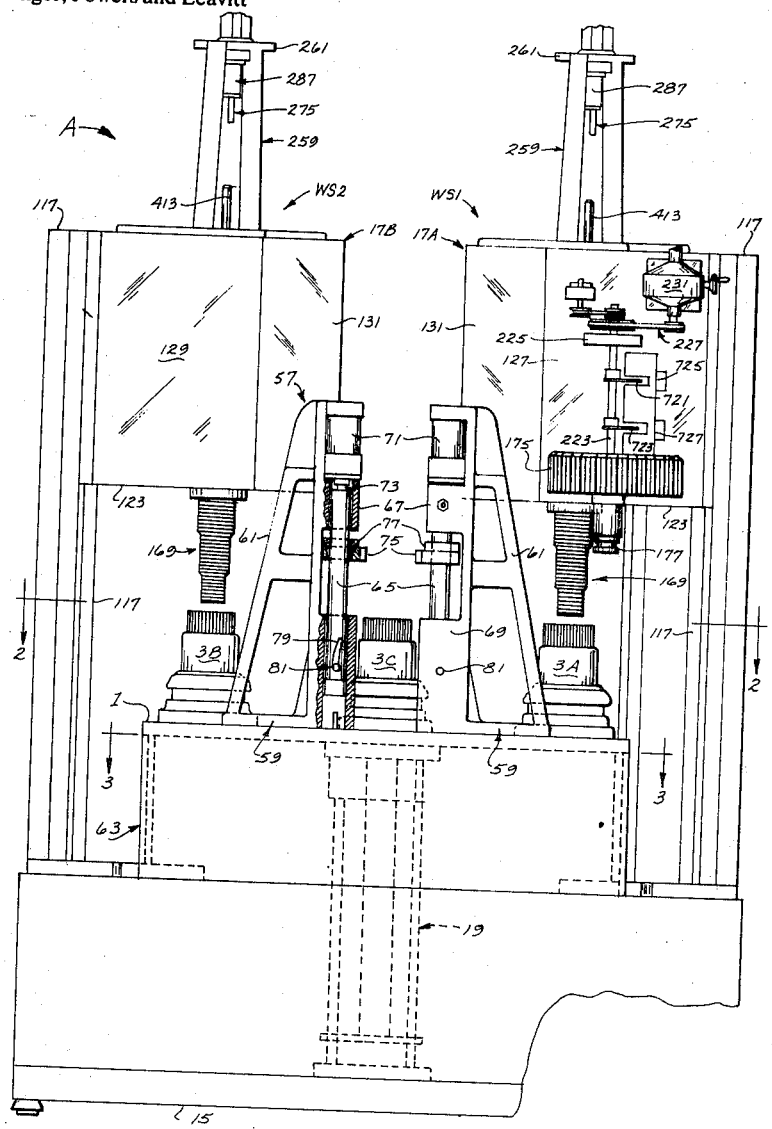

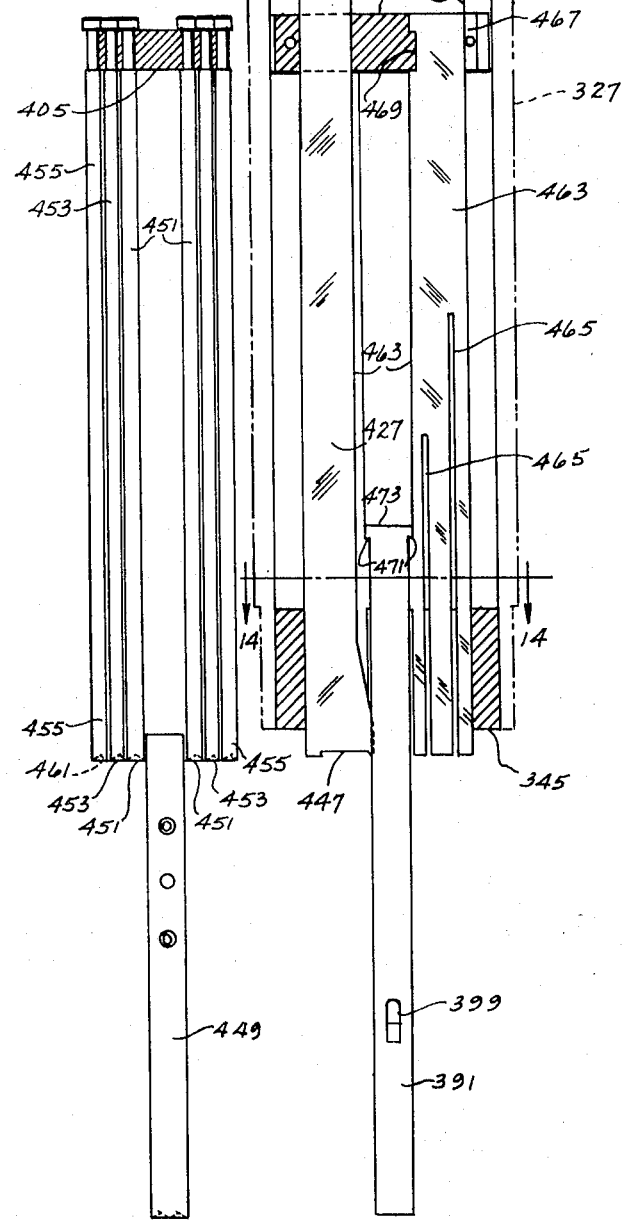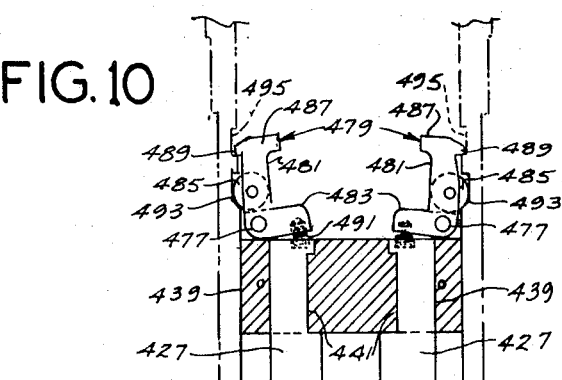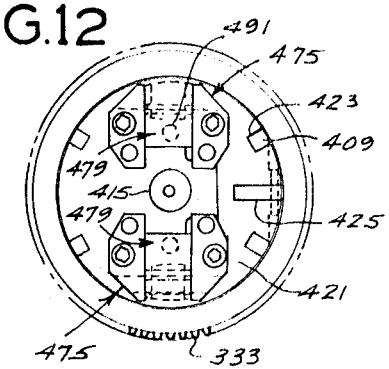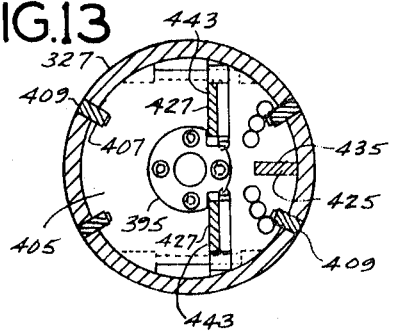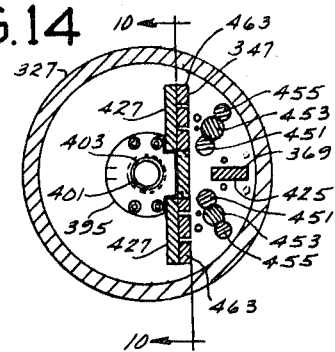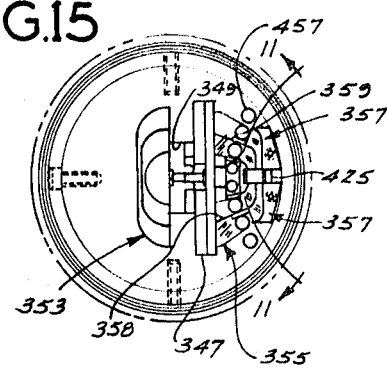

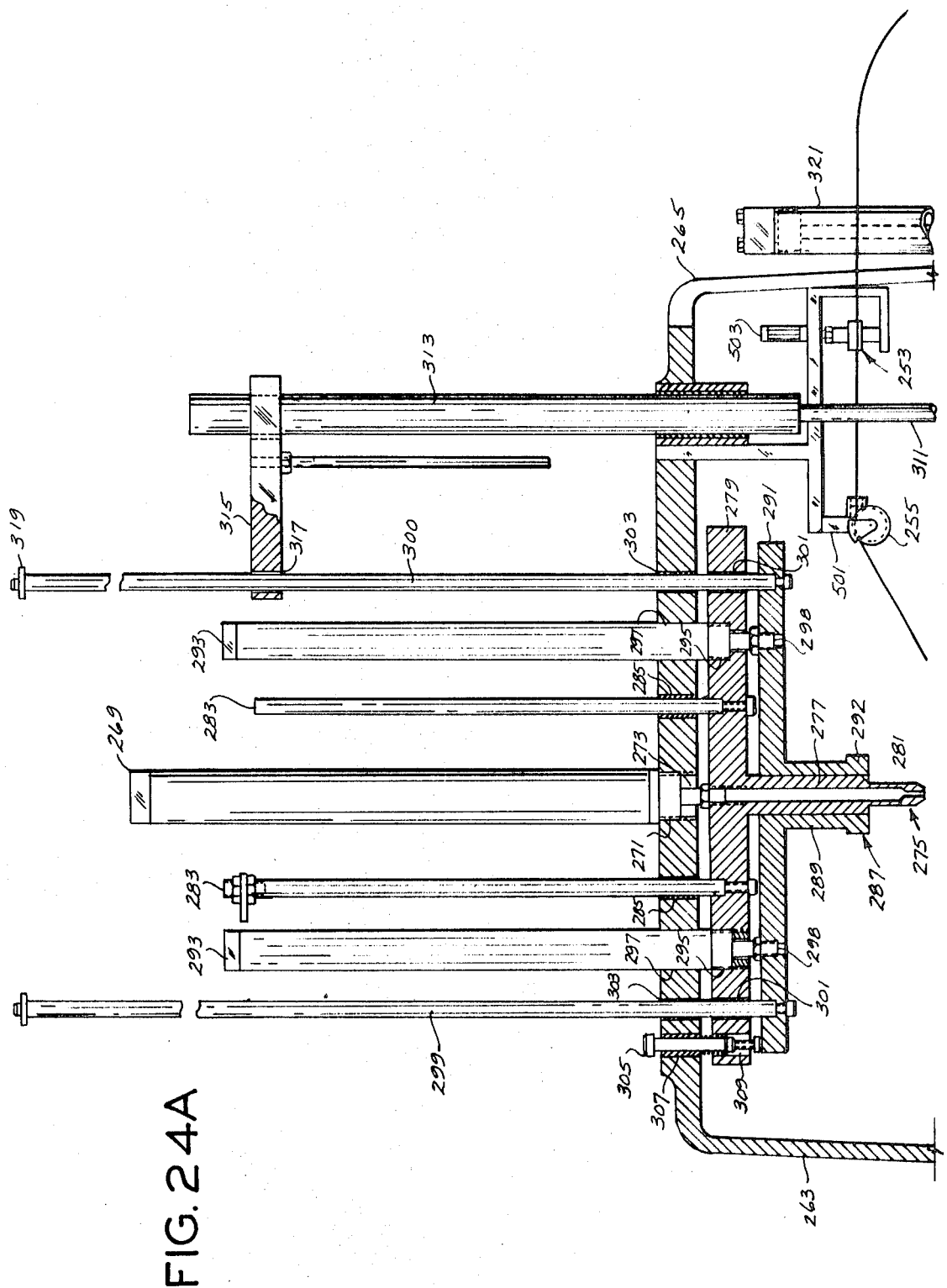

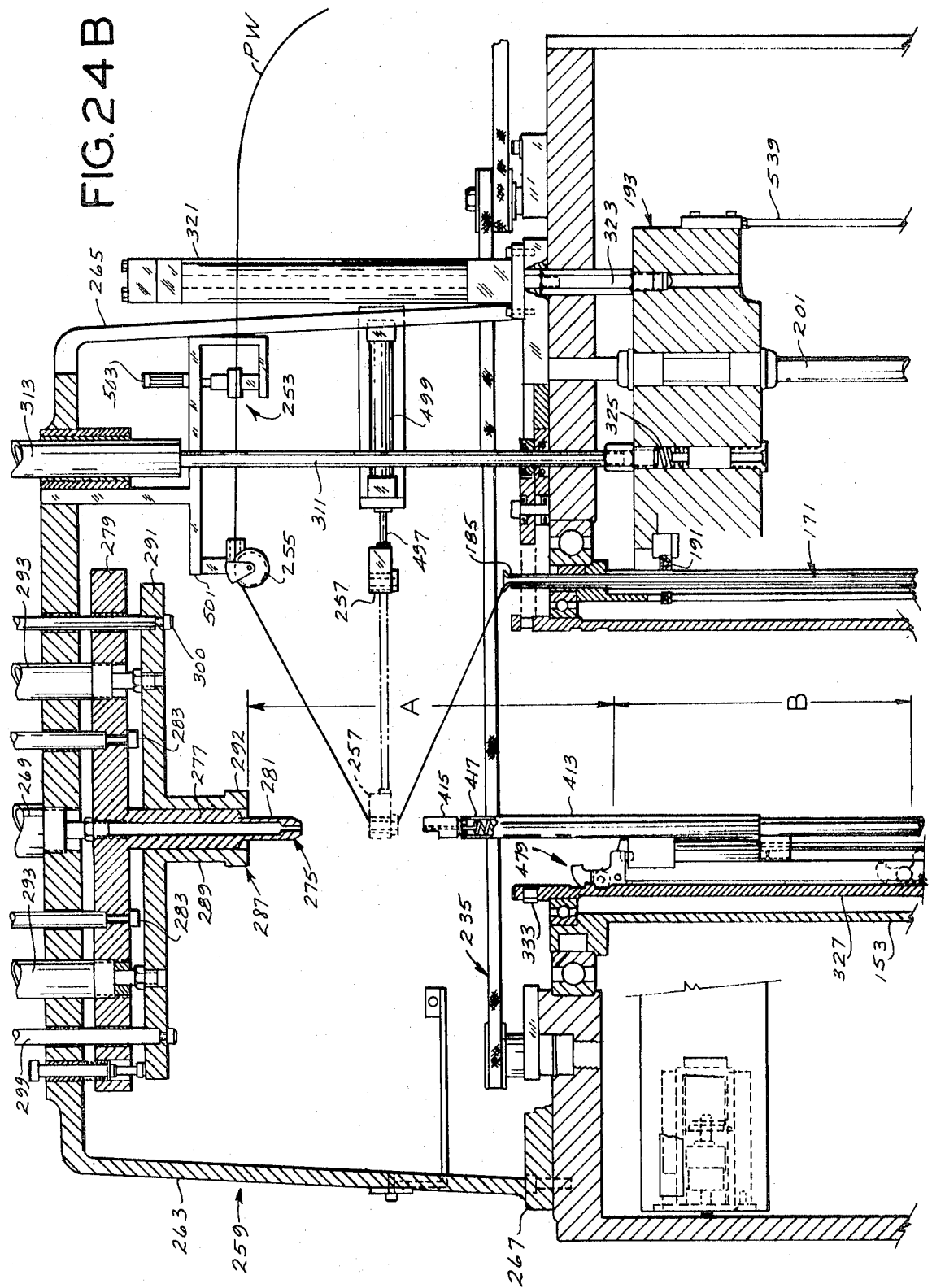

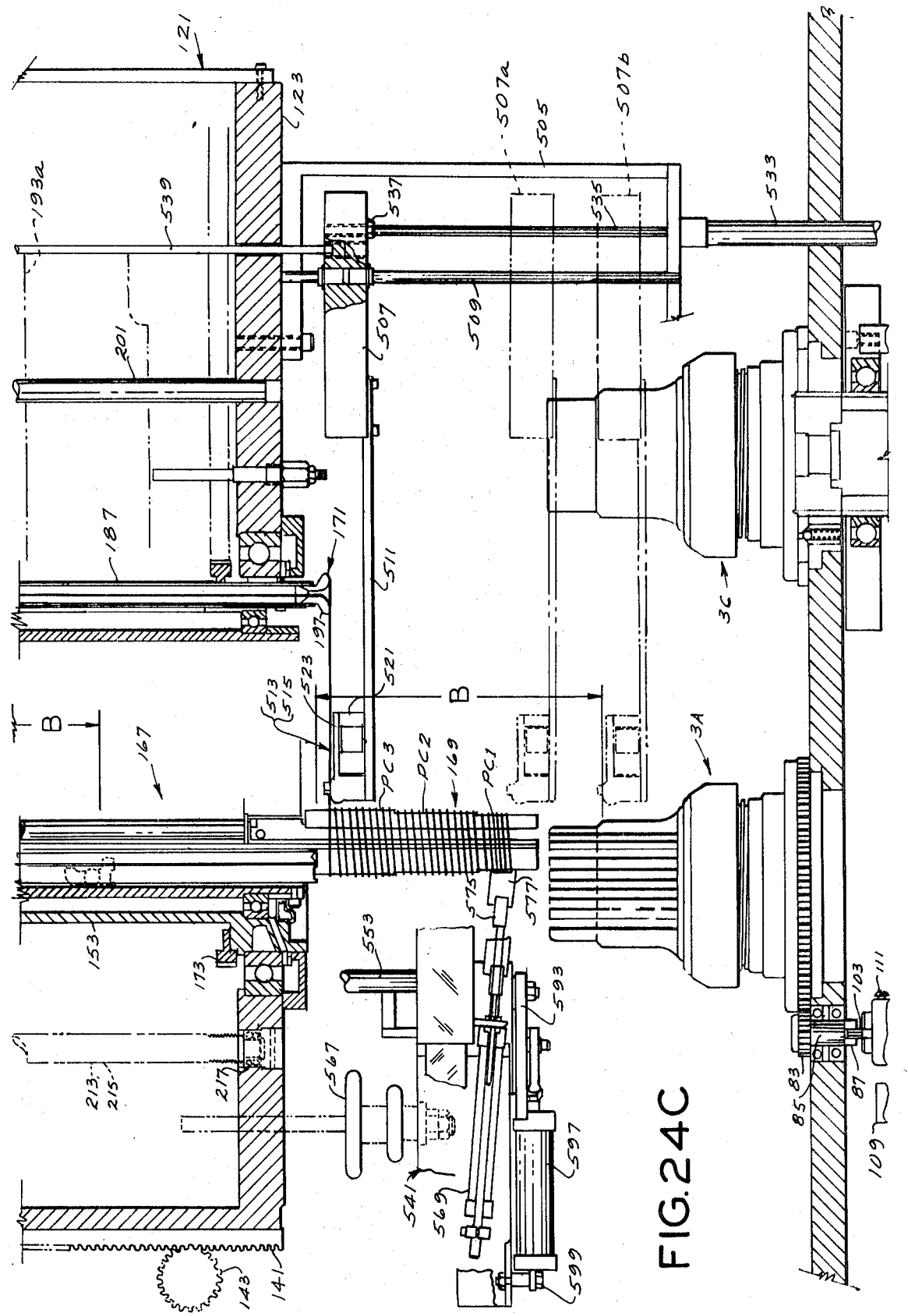

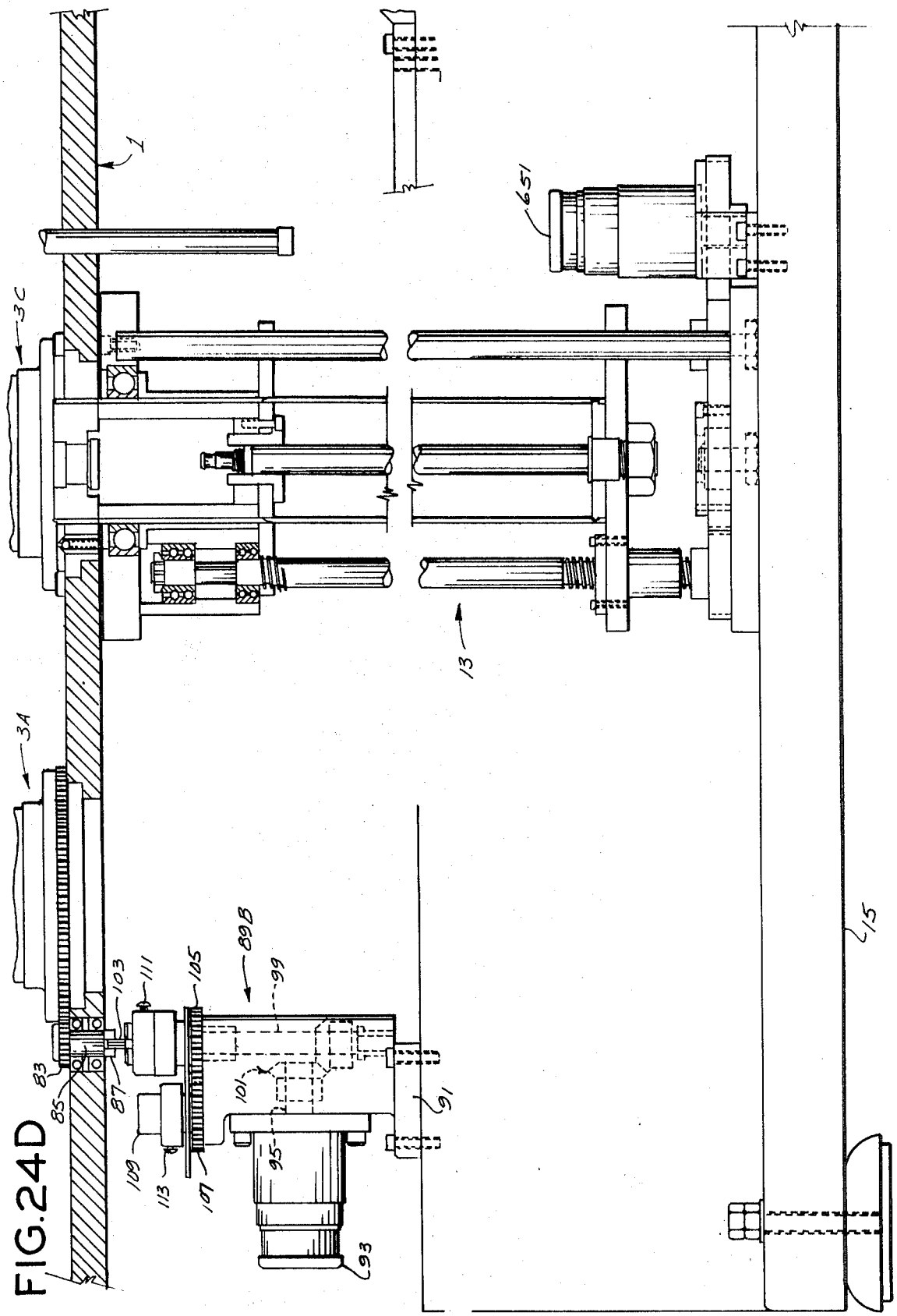

APPARATUS FOR WINDING AND PLACING COILS IN THE SLOTS OF A STATOR

BACKGROUND OF THE INVENTION

This invention relates to apparatus for winding and placing coils in the slots of a stator, e.g., the stator of an electric motor, alternator or the like, and more particularly to such apparatus for winding and placing various numbers of pole windings in the slots of a stator.

It will be understood that the stator of an electric motor conventionally has a circular bore (for the armature of the motor) and axially extending slots in radial planes extending out from the bore, coils of wire constituting the stator windings being lodged in the slots. The coils are generally disposed in groups each including a plurality of coils of different sizes, each group constituting an individual pole winding of the stator. Various approaches have been taken to the problem of providing the windings in the stator slots, including winding the coils directly in the slots, and prewinding the coils and placing the prewound coils in the slots. One example of the latter is found in U.S. Pat. No. 3,151,638, and reference may also be made to U.S. Pat. No. 3,324,536 showing apparatus for placing prewound coils in the slots by placing the coils on a set of fingers, applying a stator to the fingers, and pushing the coils off the fingers into the slots. A problem which has continued to exist is that of providing apparatus for efficiently winding and placing coils to provide various numbers of pole windings with high production rates and minimizing of manual operations. An example of such apparatus is found in our coassigned copending U.S. Pat. application, Ser. No. 791,704, filed Jan. 16, 1969, now U.S. Pat. No. 3,791,704, entitled Apparatus for Winding and Placing Coils in the Slots of a Stator, this apparatus being adapted for winding and placing two pole windings in the slots of a stator. While this apparatus has been quite successful for its intended purpose, it does not fill the need for apparatus for efficiently winding and placing coils to provide various numbers of pole windings, e.g., four main windings and four phase windings.

SUMMARY OF THE INVENTION

Among the several objects of this invention may be noted the provision of improved apparatus for winding and placing coils of wire in the slots of a stator e.g., an electric motor stator or alternators) to provide various numbers of pole windings for the stator, which efficiently carries out the operations of winding coils and placing them in the stator slots with a minimum of manual operations; the provision of such apparatus adapted simultaneously to place various numbers of windings, e.g., two, four, eight, etc. pole windings, in the slots of a stator; the provision of such apparatus adapted to carry out the winding of coils at a plurality of winding stations concurrently with the placing of coils in the slots of a stator at a placing station for high production rates; and the provision of such apparatus adapted for winding different wires into coils, e.g., a first wire for phase windings and a second wire for main windings, and placing the resultant coils in the slots of a stator.

In general, apparatus of this invention comprises an indexing conveyor, e.g., a rotary index table, carrying a plurality of placer heads, e.g., three placer heads each comprising a circular array of fingers, at spaced intervals thereon, each of these heads being adapted to hold coils for placement in the slots of a stator applied to the head. Means is provided for indexing the conveyor successively to move each placer head to each of a plurality of winding stations (two winding stations in the case of an indexing conveyor with three placer heads) and thence to a placing station. At each winding station is a coil winding and transfer mechanism comprising means for winding a wire into a coil and means for transferring the coil to the placer head at the respective winding station. Means is provided at the placing station for pushing coils from the placer head at the placing station into the slots of a stator applied to that placer head. The arrangement is such that, starting with any given placer head at the first winding station, coils wound at the latter may be transferred thereto, after which the conveyor may be indexed to bring that placer head with the coils thereon to the next winding station for transfer thereto of additional coils wound at the latter station, the placer head with its full complement of coils ultimately being indexed to the placing station where the coils are placed in the slots of a stator applied to the placer head at the placing station. Other objects and features will be in part apparent and in part pointed out hereinafter.

BRIEF DESCRIPTION OF THE DRAWINGS

FIG. 10 is a view showing certain details (with certain parts omitted) of a coil form assembly of the coil winding and transfer mechanism, in section generally on line 10—10 of FIG. 14;

FIG. 11 is a view showing certain details of the coil form assembly of FIG. 10, in developed section generally on line 11—11 of FIG. 15;

FIG. 12 is a plan of the coil form assembly of FIG. 10;

FIG. 13 is a horizontal section generally on line 13—13 of FIG. 10;

FIG. 14 is a horizontal section generally on line 14—14 of FIG. 10;

FIG. 15 is a bottom end view of the coil form assembly;

FIG. 24A is a developed view showing the upper part of the apparatus;

FIG. 24B is a developed view showing part of the apparatus below FIG. 24A, in continuation of FIG. 24A;

FIG. 24C is a developed view showing part of the apparatus below FIG. 24B, in continuation of FIG. 24B;

FIG. 24D is a developed view showing the lower part of the apparatus below FIG. 24C, in continuation of FIG. 24C;

Corresponding reference characters indicate corresponding parts throughout the several views of the drawings.

DESCRIPTION OF THE PREFERRED EMBODIMENT

Figure 1:
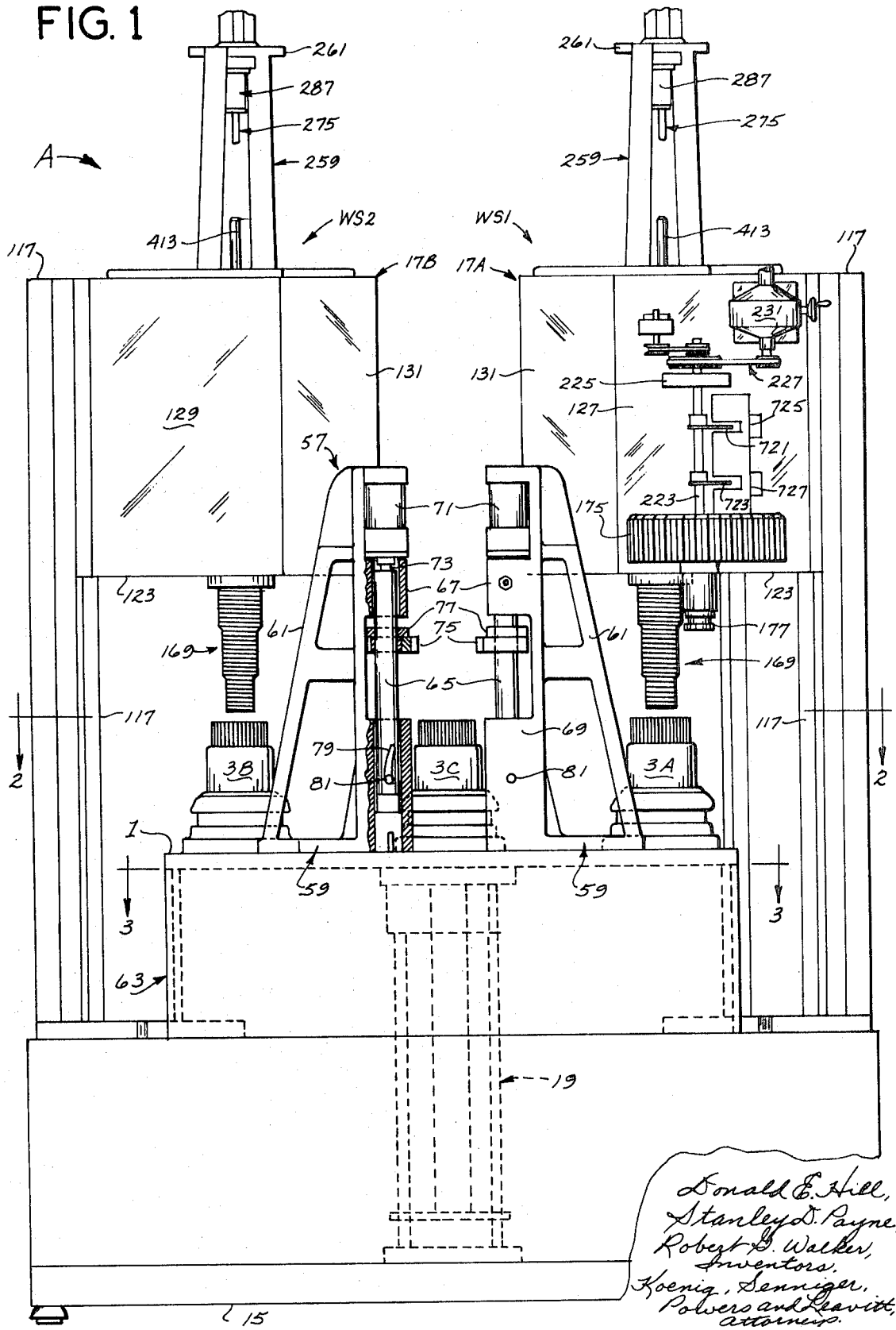
FIG. 1 is a front elevation of apparatus made in accordance with this invention, certain parts being broken away and certain parts being omitted.
Figure 2:
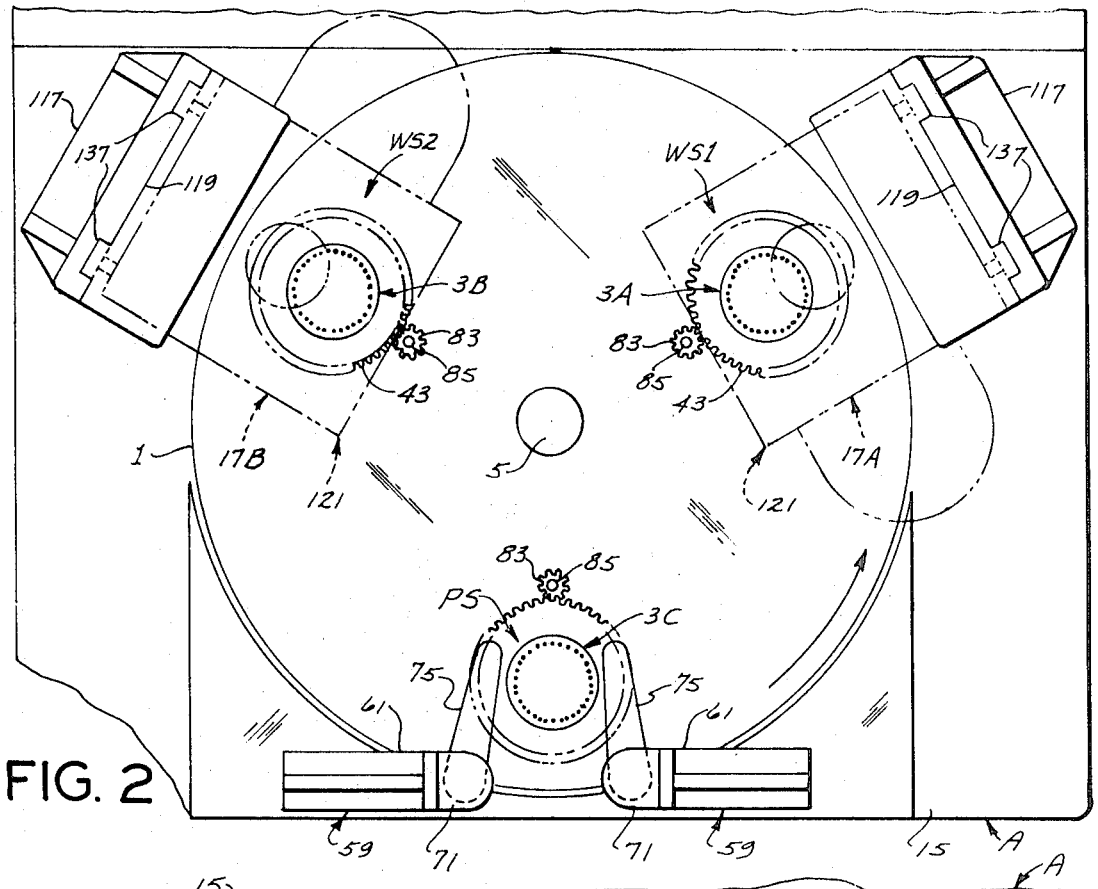
FIG. 2 is a horizontal secton on line 2—2 of FIG. 1.
Figure 3:
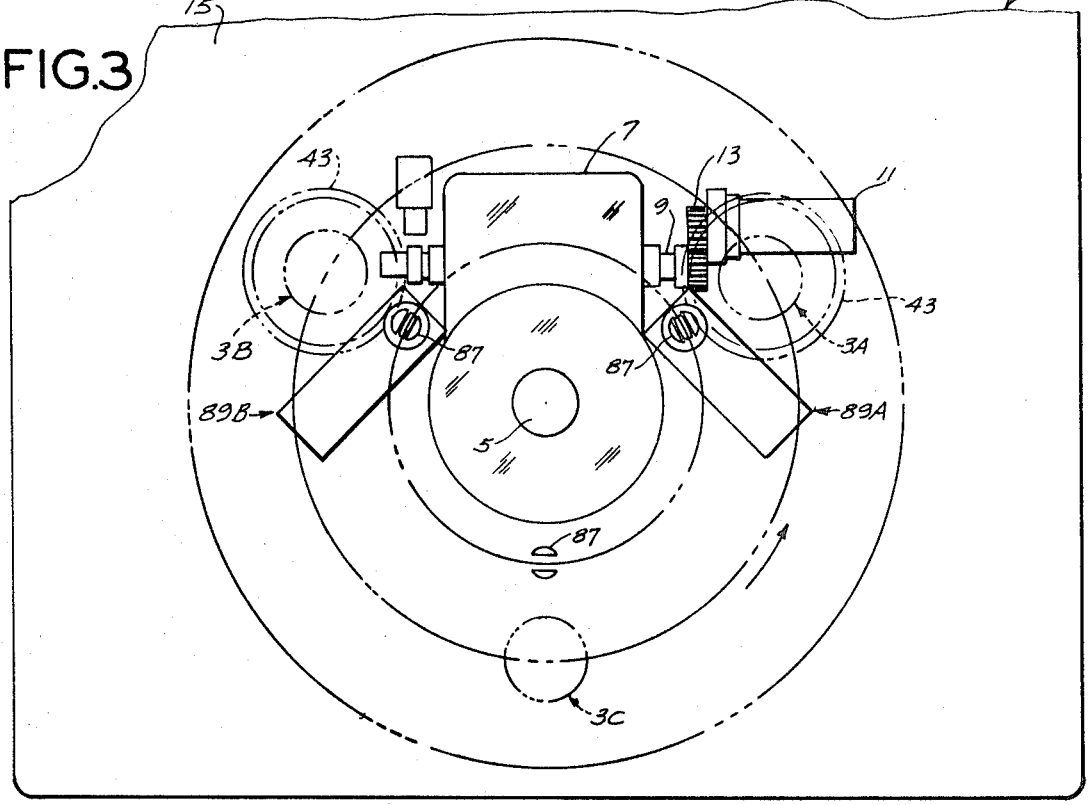
FIG. 3 is a horizontal section on line 3—3 of FIG. 1.
Figure 4:
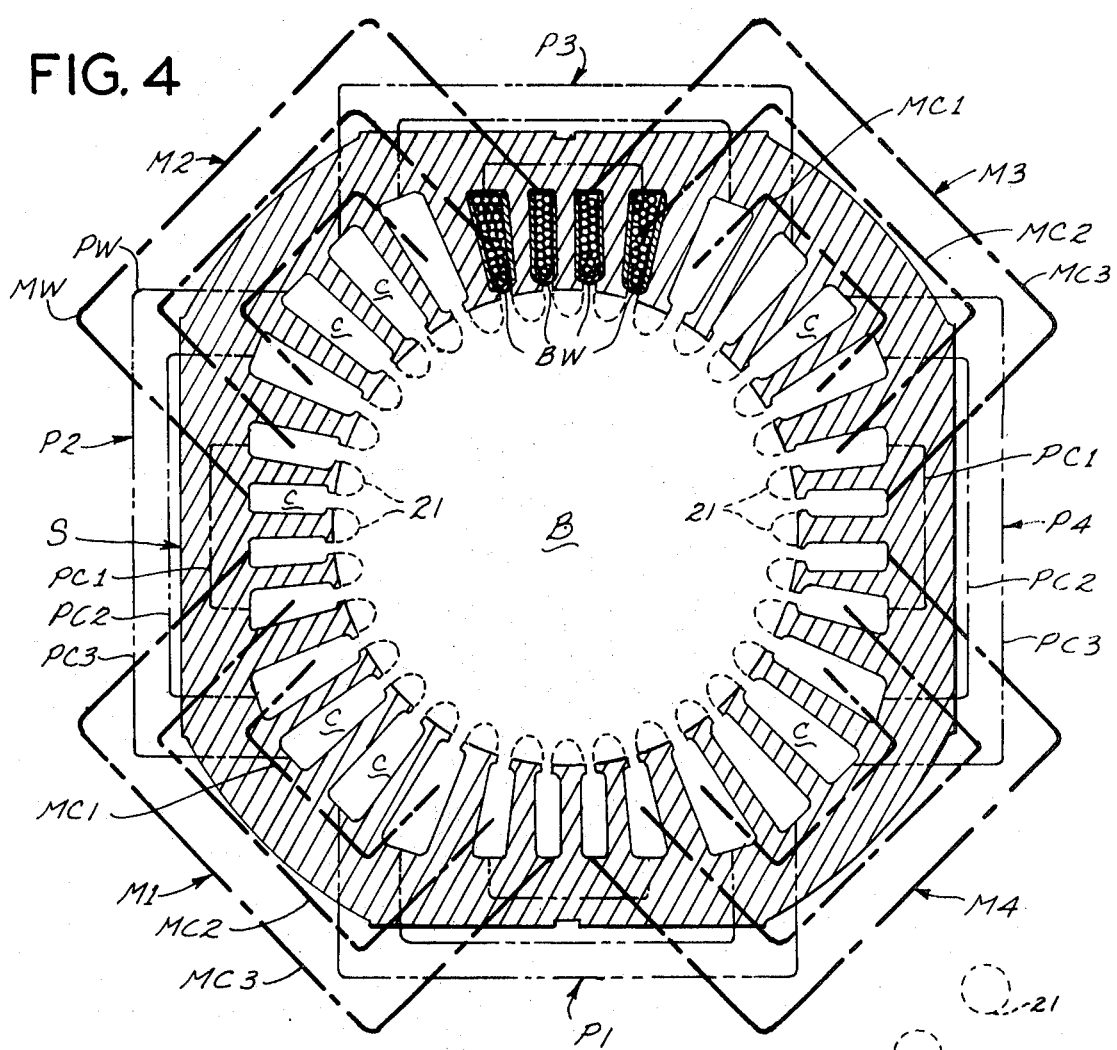
FIG. 4 is a semidiagrammatic view illustrating a typical stator with four phase windings and four main windings placed therein.

Referring first to FIGS. 1–3 of the drawings, there is generally indicated at A apparatus constructed in accordance with this invention for winding and placing pole windings in stators for electric motors, adapted for winding and placing various numbers and types of pole windings in stators, e.g., two pole windings, four pole windings, six pole windings, main and phase windings, etc. Referring more particularly to FIG. 4, a typical stator and winding assembly produced by the apparatus is shown to comprise a stator S having a circular bore B, axial slots C radiating out from the bore (32 such slots being shown by way of example), and four main windings M1–M4, and four phase windings P1–P4 received in the slots. As herein illustrated by way of example, each main winding consists of a set of three coils respectively denoted MC1–MC3, and each phase winding consists of a set of three coils respectively denoted PC1–PC3, with the main windings disposed outward of the phase windings in the stator slots. The coils MC1–MC3 are of progressively larger size, i.e., MC2 is larger than MC1 and MC3 is larger than MC2, and the coils PC1–PC3 are similarly of progressively larger size.

The four main winding sets M1–M4 are wound from a wire MW without severance of the wire between the three coils in each set and without severance of the wire between the four sets, successive sets being wound in opposite directions, e.g., the first counterclockwise, the second clockwise, the third counterclockwise and the fourth clockwise. The four phase winding sets P1–P4 are wound from a wire PW without severance of the wire between the three coils in each set and without severance of the wire between the four sets, also with successive sets wound in opposite directions. Each coil has two straight sides which are lodged in two of the stator slots and end portions at the end faces of the stator. Also, as shown in FIG. 4, a strip of insulating material is lodged in each slot, these strips being referred to as bore wedges, and denoted BW in FIG. 4. The apparatus A is adapted to wind the four main windings M1–M4 and the four phase windings P1–P4 and place these along with the bore wedges in the stator slots. As shown in FIG. 4, the four main windings M1–M4 are placed at 90° intervals relative to one another around the stator, and the four phase windings are placed at 90° intervals relative to one another around the stator but offset 45° from the main windings.

The apparatus A comprises a circular index table or turret 1 rotatable on a vertical axis in a horizontal place carrying three identical multifingered placer heads designated 3A, 3B and 3C. These extend up from the table, spaced at 120° intervals around the table, each being similar to the placer heads indicated at 5A and 5B in our copending U.S. Pat. application, Ser. No. 791,704, filed Jan. 16, 1969. Each is adapted for application thereto of sets of coils to be placed in the slots of a stator, and for application thereto, after receiving the coils, of a stator in which the coils are to be placed. The table 1 is mounted on the upper end of the upwardly extending output shaft 5 of an indexing drive unit 7 (FIG. 3) having a horizontal input shaft 9 driven by a hydraulic motor 11 via gearing 13. Unit 7, which may be any of various suitable commercially available intermittent indexing drive units, is mounted on a base 15, as is the motor 11. It is adapted to rotate the table in 120° steps, corresponding to the 120° intervals between the placer heads, the direction of rotation being counterclockwise as viewed from above, with dwell intervals between successive indexing steps.

During each dwell of the table 1, one placer head is positioned at a first winding station WS1, the next successive placer head (in counterclockwise direction around from the head at WS1) is positioned at a second winding station WS2, and the third placer head is positioned at a placing station PS. As shown in FIGS. 1 and 2, head 3A is at station WS1, head 3B is at WS2 and head 3C is at PS. On the next indexing step of the table, 3A is indexed to WS2, 3B to PS and 3C to WS1; on the next indexing step, 3A is indexed to PS, 3B to WS1 and 3C to WS2; on the next indexing step, 3A is indexed to WS1, 3B to WS2 and 3C to PS; etc. The placing station PS is located adjacent the front of the base 15 in generally centered position between the sides of the base, winding station WS1 is adjacent the right side and toward the rear of the base, and winding station WS2 is adjacent the left side and toward the rear of the base. Each placer head, in addition to being rotatable with the table, is rotatable relative to the table on the central vertical axis of the placer head, as will appear.

Figure 6:
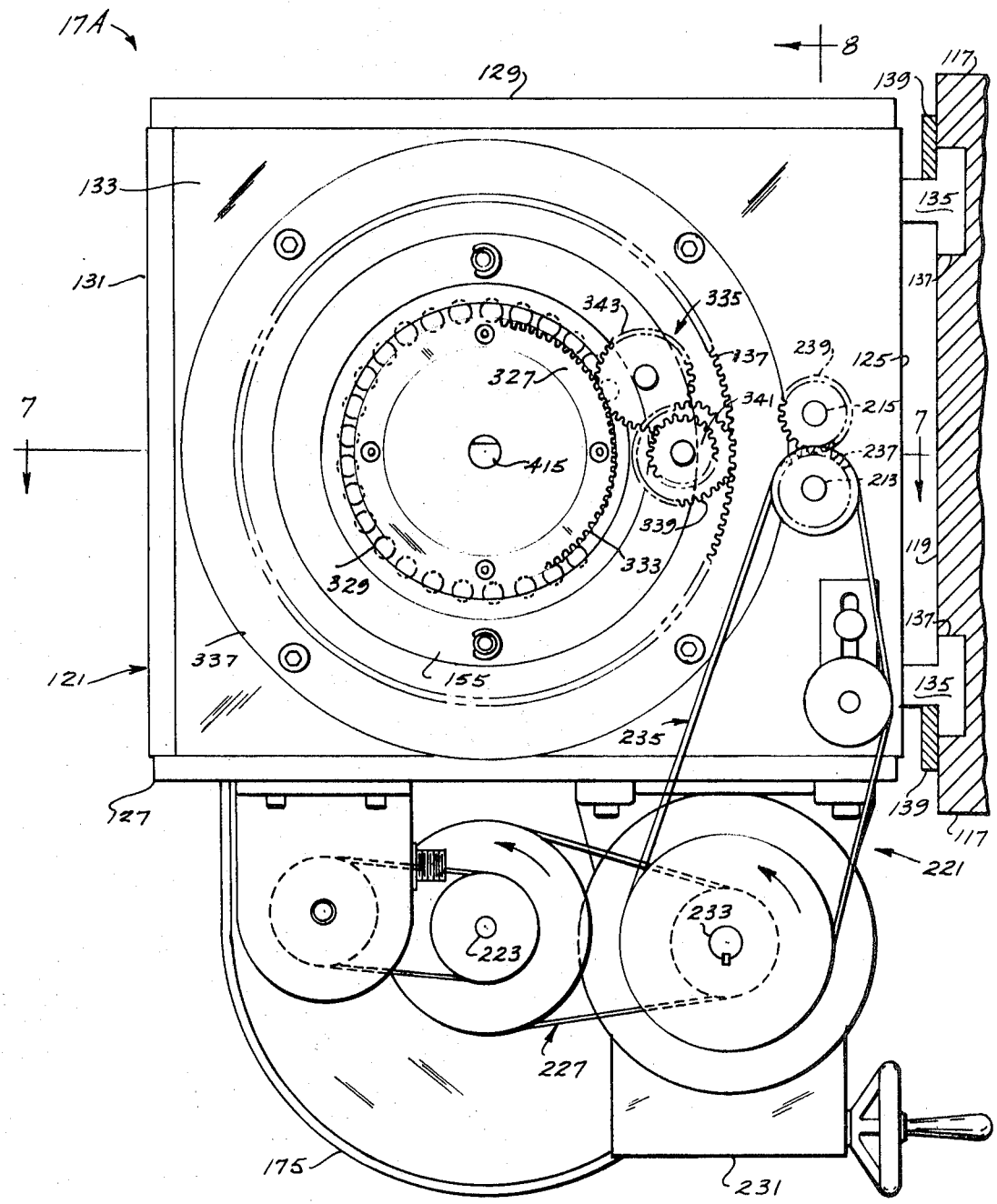
FIG. 6 is a plan of a coil winding and transfer mechanism of the apparatus, with certain parts omitted.
Figure 7:
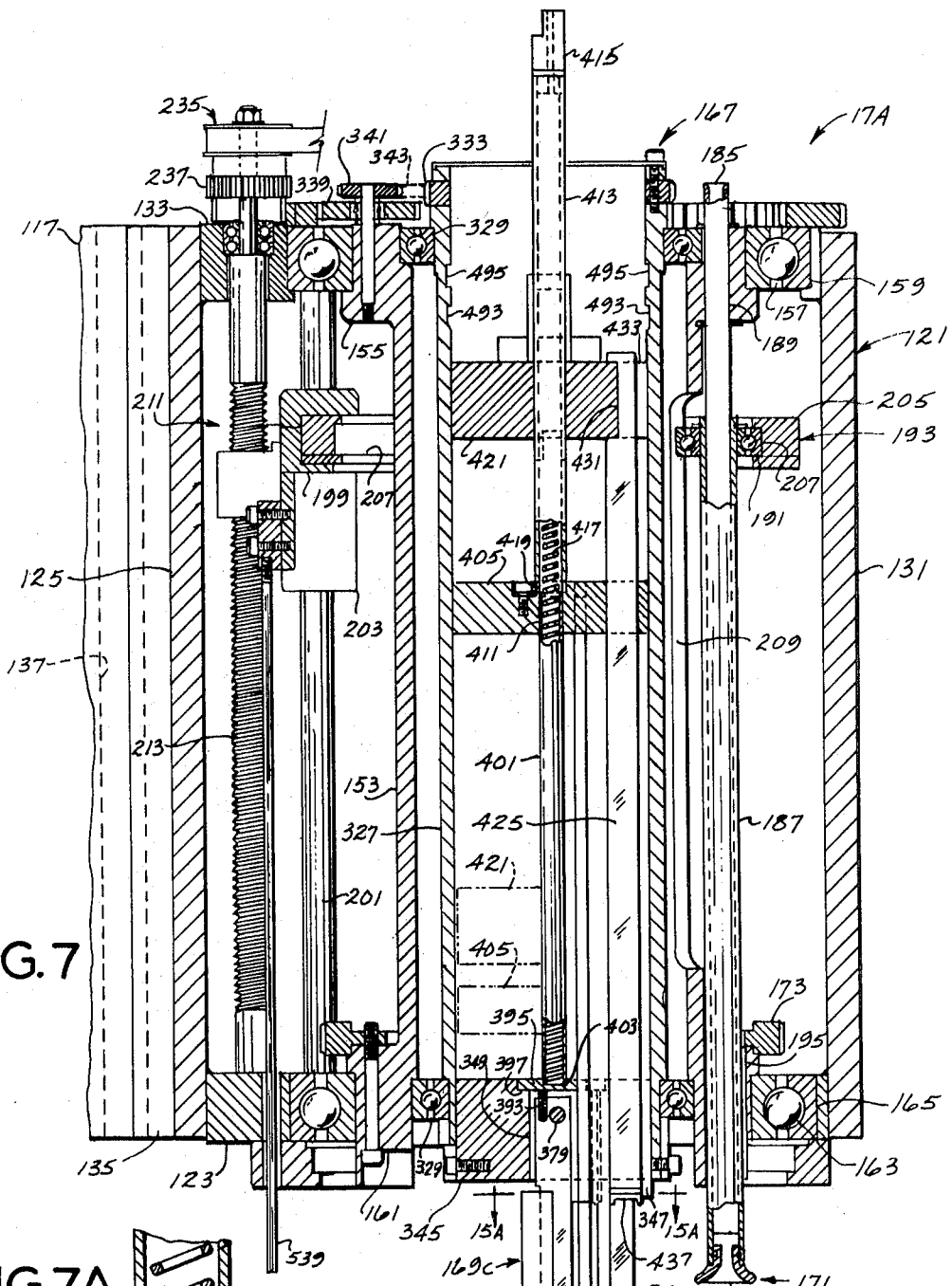
FIG. 7 is a vertical section generally on line 7—7 of FIG. 6.
Figure 7A:
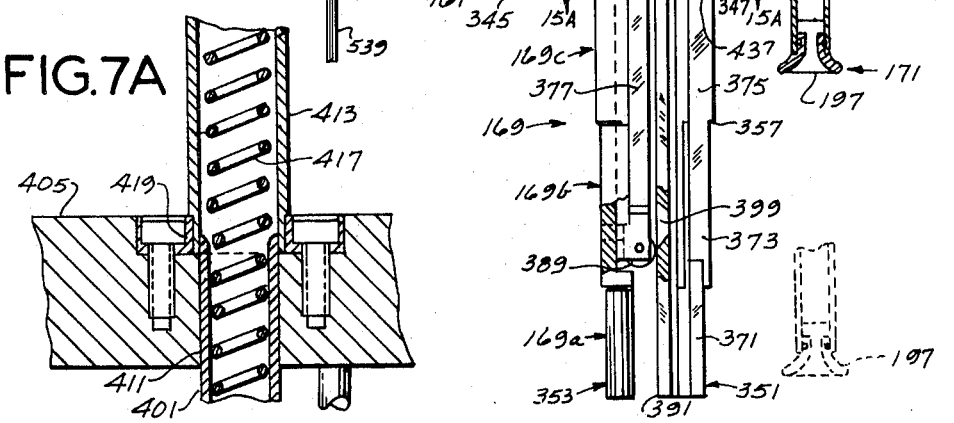
FIG. 7A is an enlarged fragment of FIG. 7.
Figure 8:
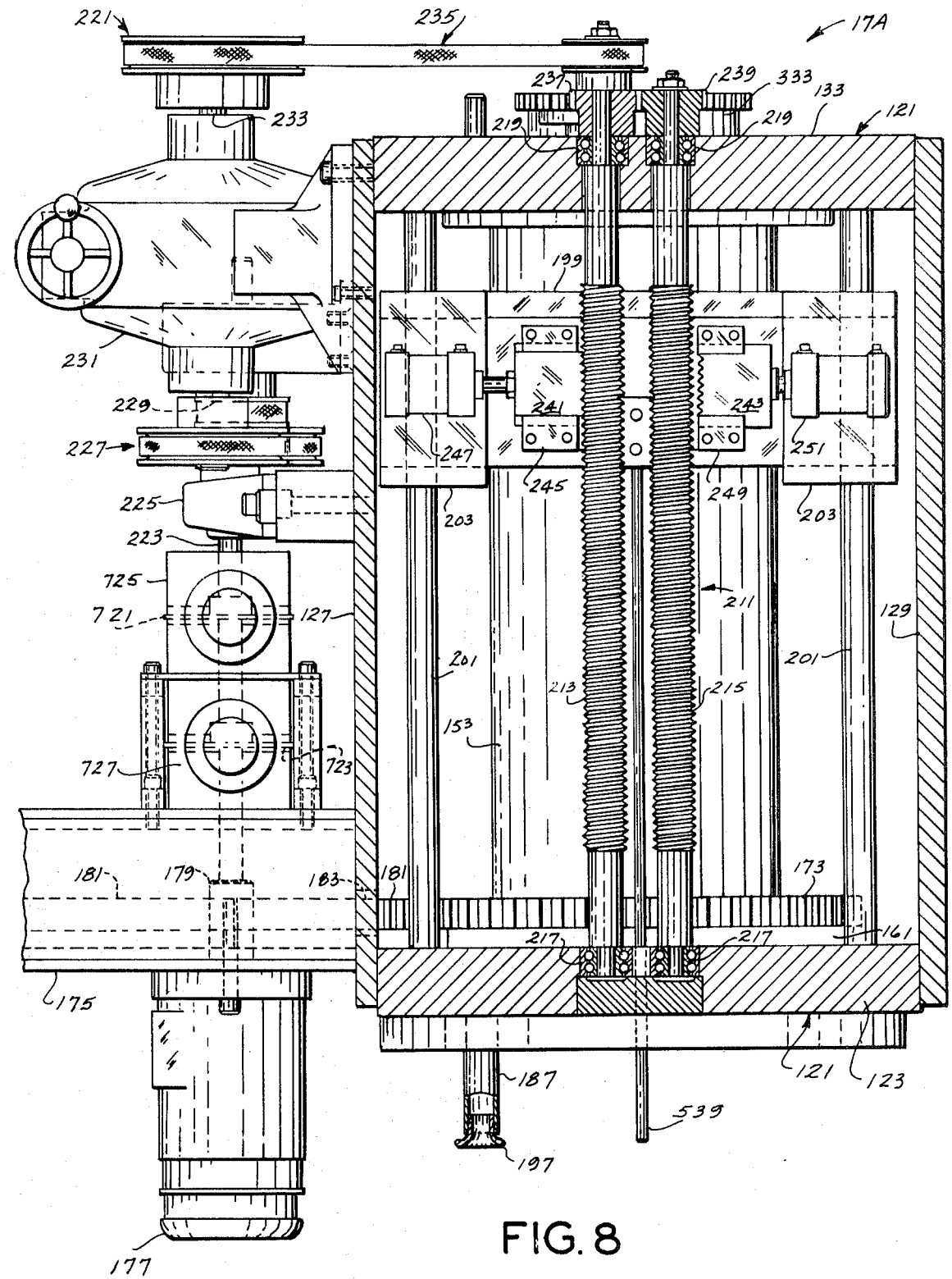
FIG. 8 is a vertical section generally on line 8—8 of FIG. 6, jogged to show parts in elevation.
Figure 9:
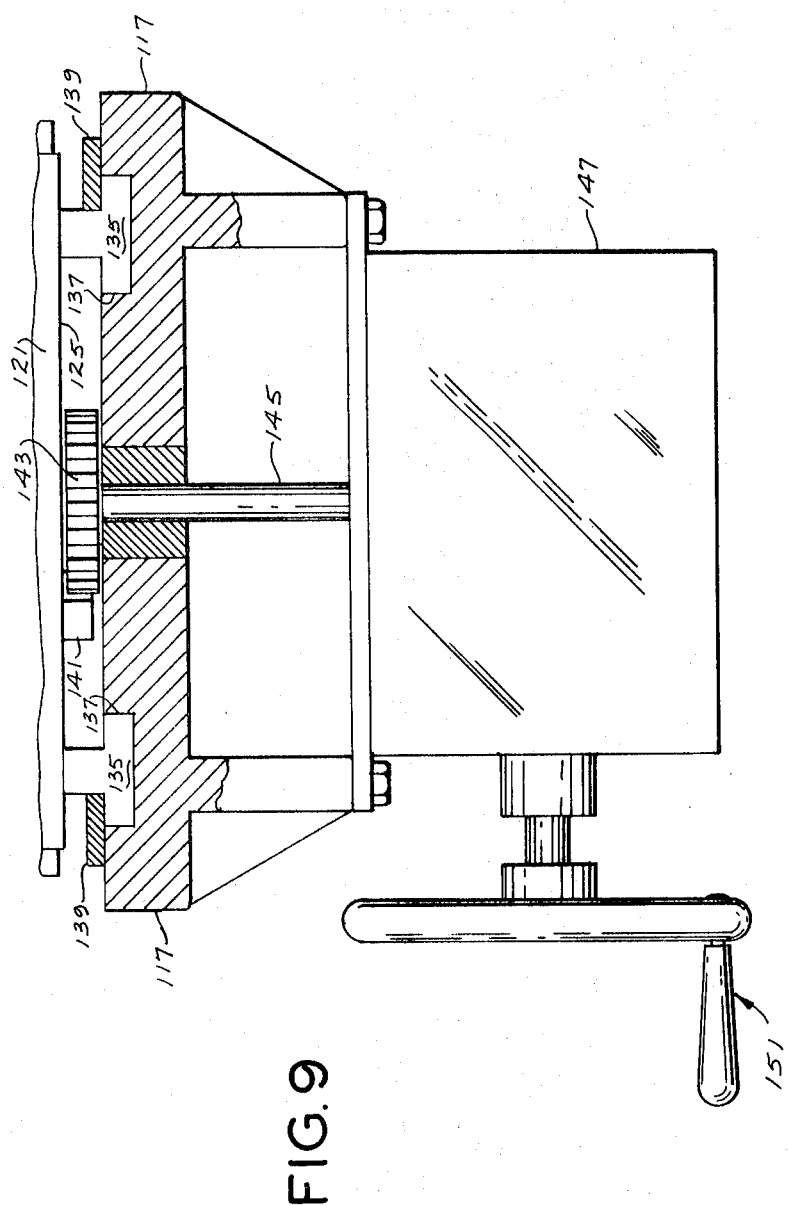
FIG. 9 is a view illustrating a height adjustment for a winder box of the coil winding and transfer mechanism.
Figure 22:
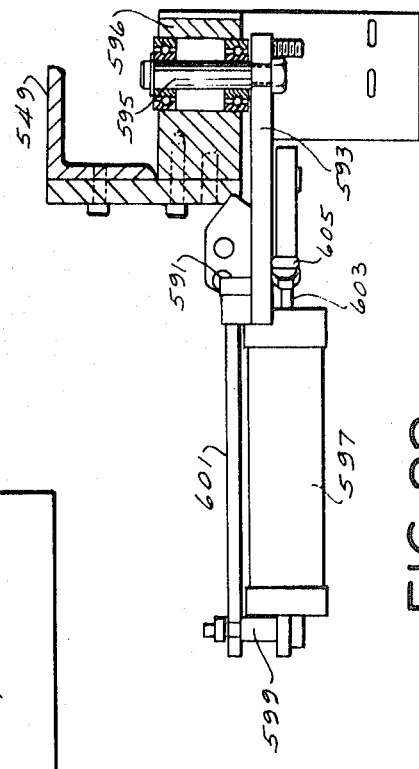
FIG. 22 is a view generally across plane 22—22 on FIG. 20.
Figure 16:
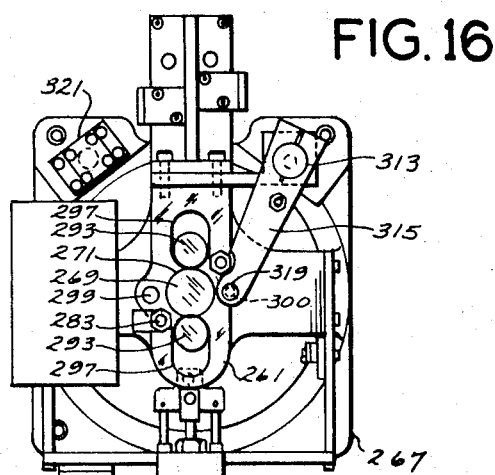
FIG. 16 is a plan of a subassembly which is located on top of the winder box.
Figure 17:
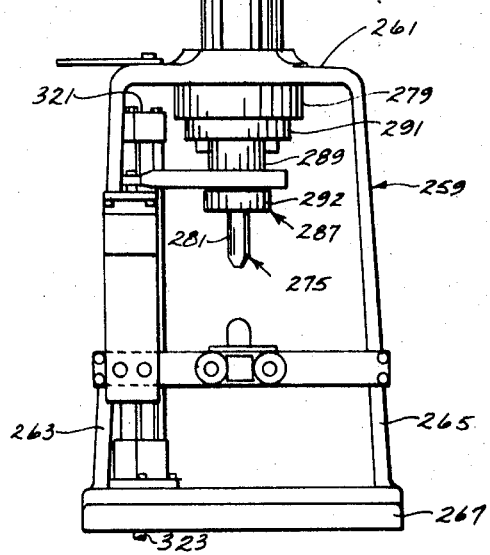
FIG. 17 is a front elevation of the FIG. 16 subassembly.
Figure 18:
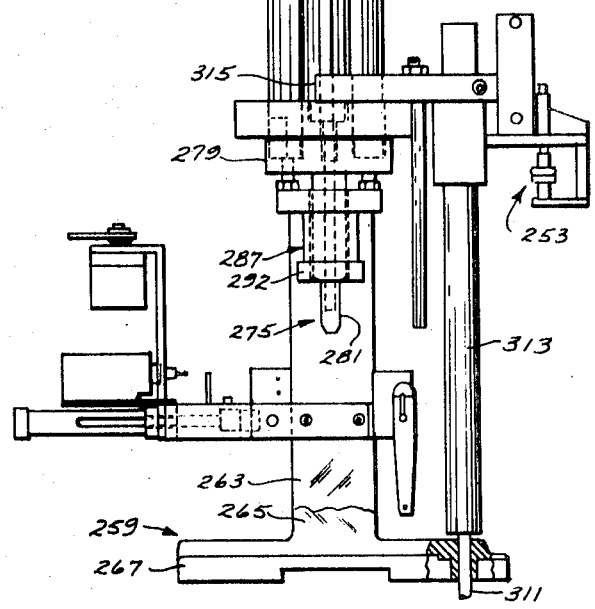
FIG. 18 is a side elevation of the FIG. 16 subassembly.

A first coil winding and transfer mechanism generally designated 17A (FIGS. 6–8) is provided at the first winding station WS1 for winding coils and transferring them to the placer head at winding station WS1, and a second like coil winding and transfer mechanism 17B is provide for winding coils and transferring them to the placer head at winding station WS2 (FIG. 1). These mechanisms 17A and 17B are substantially identical. Each is adapted to wind a wire into a set of coils without severance of the wire between coils, transfer it to the respective placer head, wind another set, transfer it to the head, etc. For example, mechanism 17A is adapted to wind the first phase winding P1, transfer it to the placer head at winding station WS1, wind the second phase winding P2, transfer it to the head at WS1, wind the third phase winding P3 and transfer it to the head at WS1, and then wind the fourth phase winding P4 and transfer it to the head at WS1. Similarly, mechanism 17B is adapted successively to wind the four main windings M1–M4 and transfer them to the head at winding station WS2.

Generally, in the operation of the apparatus coils are wound at the first winding station WS1 and transferred to the placer head at this station. Then, the table 1 is indexed 120° to bring that placer head with the coils thereon to the second winding station WS2, and additional coils are wound at WS2 and transferred to the placer head at WS2. Then, the table 1 is indexed 120° to bring the placer head from the winding station WS2 to the coil placing station PS, at which there is a coil and wedge driving unit 19 adapted for operation to drive the coils on the placer head at PS into the slots of a stator applied to the head, and simultaneously to drive bore wedges into the slots. The arrangement is such that, during each dwell of the table 1, winding and transferring operations may be carried out simultaneously at winding stations WS1 and WS2 and a placing operation carried out at placing station PS.

Figure 5:
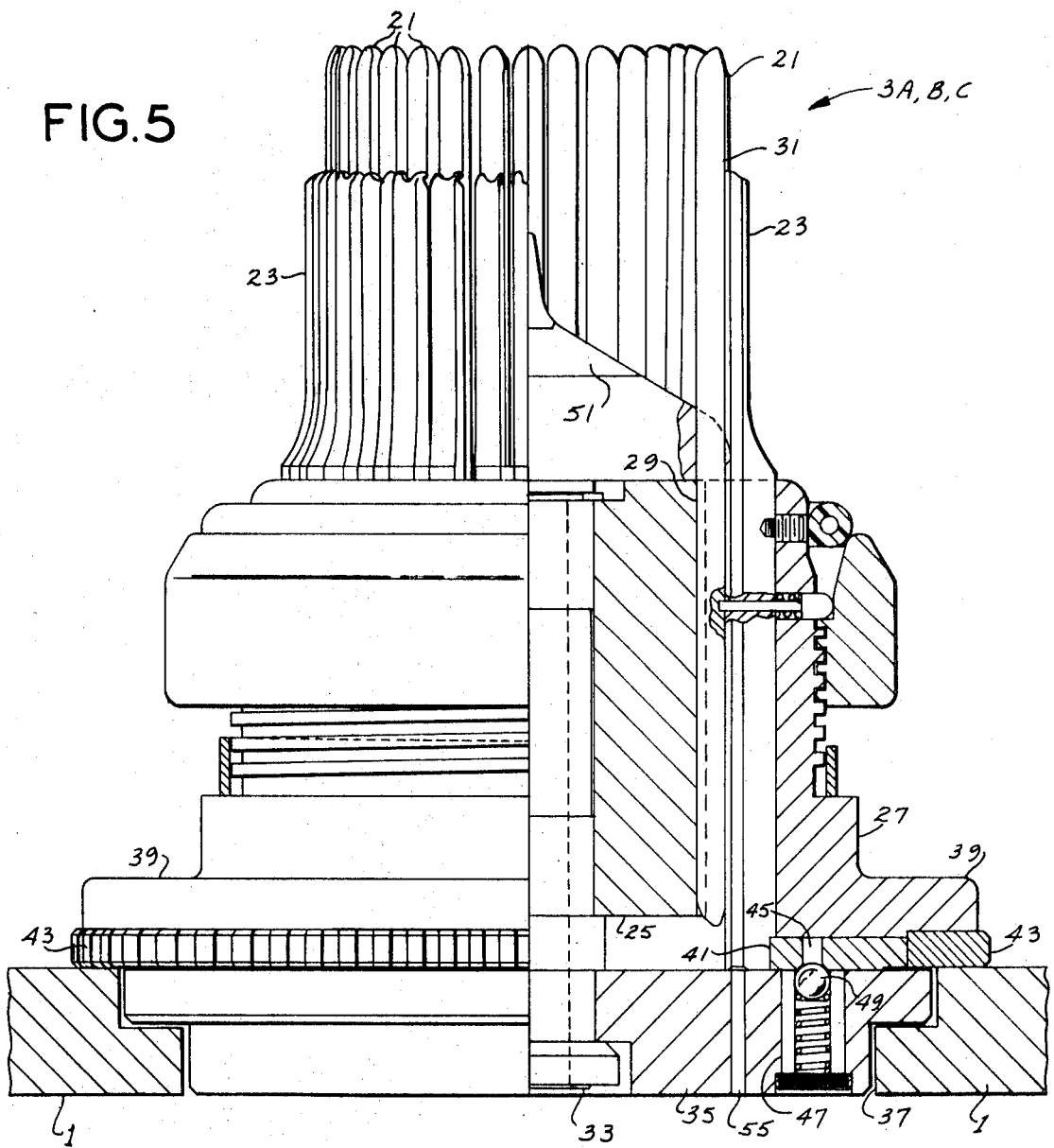
FIG. 5 is a view partly in elevation and partly in section showing a placer head of the apparatus.

Each of the placer heads 3A, 3B and 3C (these being identical) comprises a set of fingers 21 and wedge guide members 23 (similar to the fingers and wedge guide members denoted 13 and 15 in U.S. Pat. No. 3,374,536 and 379 and 381 in said copending application, Ser. No. 791,704) arranged in a circle with spaces therebetween extending upward from between a fluted finger holder 25 and a surrounding collar 27 (FIG. 5). The finger holder is of tubular cylindric form with flutes 29 extending vertically in its outer periphery. The fingers extend lengthwise (vertically) in the flutes and project upward from between the finger holder and the collar. The fingers are arranged with their outer faces on a circle having a diameter corresponding to the diameter of the stator bore B for a sliding fit of the stator S on the fingers. The number of fingers corresponds to the number of radial partitions R of the stator, and the stator is adapted to be applied to the fingers with partitions R registering with the fingers in the outside thereof, as illustrated in FIG. 4. The wedge guide members 23 have their inner sides seated in longitudinal grooves 31 in the outside of the fingers and project upward from between the finger holder and the collar on the outside of the fingers, terminating short of the upper ends of the fingers. The fingers and wedge guide members are suitably clamped in place between the finger holder and the collar.

The finger holder 25 is rotatable on a tubular hub 33 having its lower end fixed in a circular plate 35 secured in an opening 37 in the table. The collar 27 has an outwardly extending flange 39 at its lower end. A flat ring 41 is secured to the bottom of this flange concentric with the finger holder and collar. A ring gear 43 is secured to the bottom of the flange surrounding the ring 41. The latter has a series of detent recesses 45 in its bottom spaced at equal angular intervals therearound. For example, it may have four such recesses spaced at 90° intervals for determining four indexed positions of the placer at 90° intervals around the vertical axis of the placer head (i.e., the vertical axis of hub 33). The ring 41 is rotatably seated on the circular plate 35, and the latter has a cavity 47 in which is pocketed a spring-biased ball detent 49 engageable in any one of recesses 45 for detaining the placer head in each of its four indexed positions.

Figure 19:
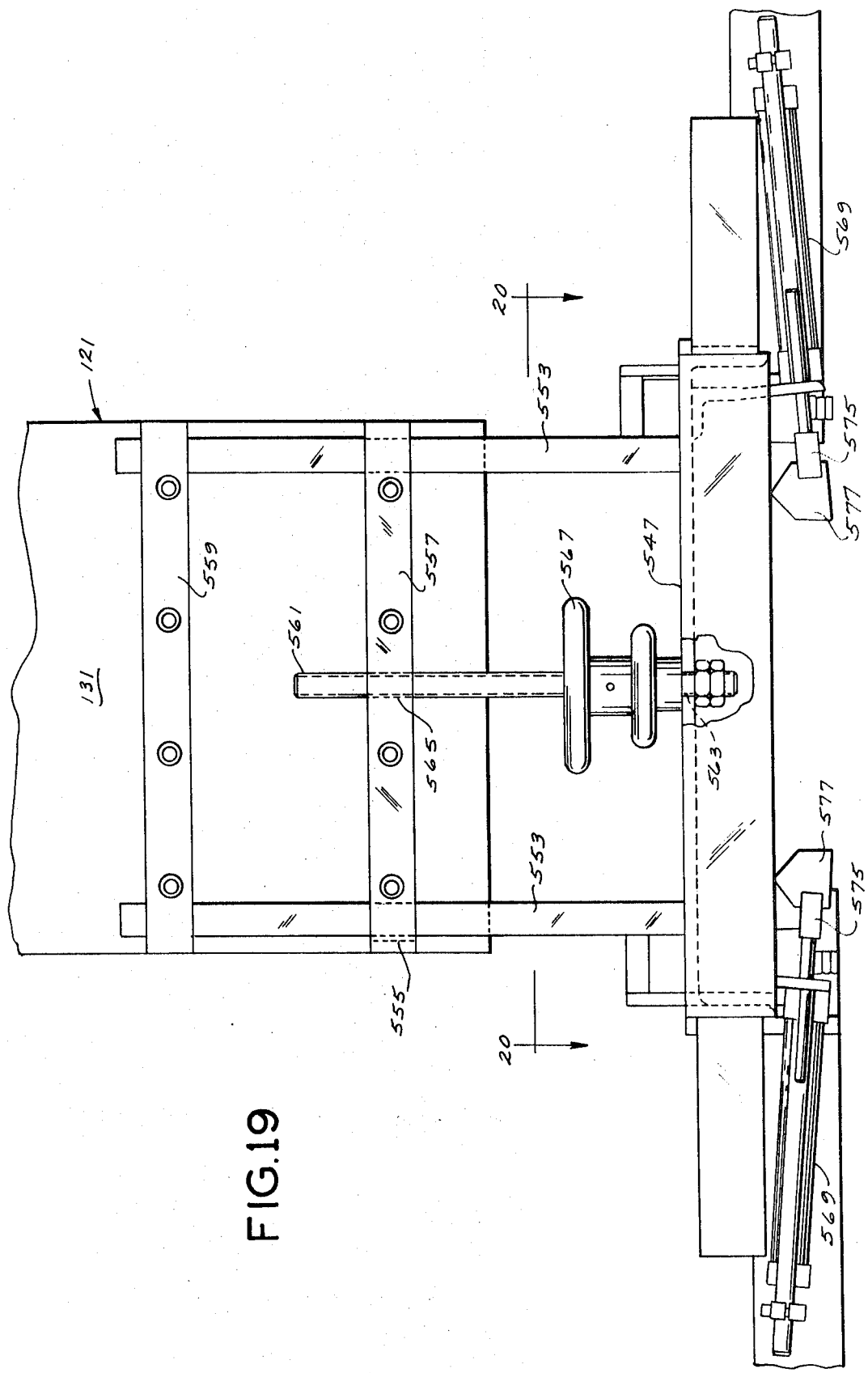
FIG. 19 is a view in elevation of a subassembly which is supported in position below the winder box.

A stripper 51 for driving coils placed on fingers 21 into the slots of a stator is axially (vertically) slidable within the array of fingers 21 above the finger holder 25. This stripper is identical to the stripper designated 405 in the aforesaid copending U.S. application, Ser. No. 791,704 (and shown in FIGS. 19-21 thereof) and reference may be made thereto for full details. It is adapted for actuation by the coil and wedge driving unit indicated at 19 (FIG. 1) at the placer station PS to drive coils on the placer head at the placing station into the slots of a stator S applied to that head. This coil and wedge driving unit 19 is identical to the coil and wedge driving unit designated 13 in U.S. application, Ser. No. 791,704 (and shown in FIG. 19 thereof) and reference may be made thereto for full details. In referring thereto, it will be observed that the coil and wedge driving unit includes a circular series of wedge push rods (designated 527 therein) for driving bore wedges BW into the stator slots. Plate 35 of the apparatus of this invention has a circular array of openings 55 for these wedge push rods.

Means generally designated 57 is provided at the placing station PS for clamping a stator S on the upper ends of the fingers 21 of the placer head at the placing station to prevent the stator from moving upward during the placement of coils in the stator slots. As shown in FIG. 1, this clamping means 57 comprises a pair of clamp units each designated 59 at the front of the apparatus at the placing station PS. Each clamp unit 59 comprises a column 61 extending upward from a superstructure 63 on the base 15, the two columns being at opposite sides of the placing station. A rod 65 is vertically slidable and rotatable in vertically spaced upper and lower guides 67 and 69 on the inside of the column. Above the upper guide 67 is a hydraulic cylinder 71. This has a piston rod 73 extending down from a piston therein (not shown) through the lower end head of the cylinder secured to the upper end of the rod 65. A clamp jaw 75 is secured as indicated at 77 to the rod 65 between the upper and lower guides. The portion of rod 65 within the lower guide has a cam slot 79 receiving a follower 81 carried by the column 61. The arrangement is such that, when the piston rod 73 is retracted upward into the cylinder 71, rod 65 occupies a raised retracted position in which clamp jaw 75 is in a raised retracted position above the level of a stator S on the placer head at the placing station PS and angled out of the way of the placer head to permit a stator to be placed thereon. On operation of cylinder 71 to drive piston rod 73 downward, rod 65 is driven downward and also rotated on its axis via follower 81 and cam slot 79 to swing jaw 75 into position above the stator placed on the placer head at placing station PS and move the jaw downward into engagement with the top of the stator to clamp it in place.

Associated with each of the placer heads 3A, 3B and 3C is a pinion 83 in mesh with the placer head ring gear 43. Each pinion 83 is secured on the upper end of a shaft 85 (see FIGS. 2 and 24D) journaled in a vertical hole in the table 1 alongside the respective opening 37 in the table. Shaft 85 has a forked coupling element 87 (see FIGS. 3 and 24D) at its lower end on the underside of the table 1. When a placer head 3A, 3B or 3C is indexed to winding station WS1, the coupling element 87 of shaft 85 for that placer head is coupled to a placer head indexing means generally designated 89A at station WS1. Similarly, when a placer head 3A, 3B or 3C is indexed to winding station WS2, the coupling element 87 on shaft 85 for that placer head is coupled with a placer head indexing means generally designated 89B at station WS2. The two placer head index means 89A and 89B at winding stations WS1 and WS2 are identical, each being mounted in fixed position on the base 15 below the table 1. Each comprises a frame 91 (see FIG. 24D) mounted on base 15 carrying a horizontally positioned hydraulic motor 93 having its output shaft 95 extending horizontally. A vertical drive shaft 99 journaled in the frame is driven from the output shaft of the hydraulic motor via bevel gearing 101. The vertical drive shaft extends up above the top of the block and has a coupling element 103 in the form of a key mounted on its upper end. Below this is a gear 105 in mesh with a gear 107 on a shaft 109 extending up from the block. Pins indicated at 111 and 113 are rotatable with shafts 99 and 109 for actuating suitable limit switches in a suitable system for indexing operation of motor 93 to rotate key 103 in 90° indexing steps and to position the key for mating with a coupling element 87.

As previously noted, the coil winding and transfer mechanism 17A at winding station WS1 and the coil winding and transfer mechanism 17B at winding station WS2 are substantially identical, and a description of 17A will suffice for both. Referring now more particularly to FIGS. 1, 2 and 6-9, the coil winding and transfer mechanism 17A is shown to comprise a column 117 extending up from the base 15 adjacent its respective rear corner of the base. The column 117 has a flat vertical front face 119 in a plane at right angles to the radial plane of the table 1 which extends through the vertical axis of the placer head at winding station WS1, this face being spaced outward from the periphery of the table. The column is generally centered with respect to said radial plane. A winder housing or box 121 is cantilevered over the table 1 at the winding station WS1 from the inside face of the column. This box is of rectangular cross section, having a bottom 123, a backwall 125, sidewalls 127 and 129, a front wall 131 and a cover 133. It is vertically slidable on the inside of the column for adjustment of its elevation relative to the table 1, having a pair of vertical T-shaped sliders 135 on the back of its backwall 125, the heads of these sliders being slidable in guide channels 137 in the inside face of the column for this purpose and held therein by gibs 139. Means for vertically adjusting the box on the column and holding it in adjusted position is shown to comprise a rack 141 extending vertically on the back of the backwall 125 of the box 121 and a pinion 143 in mesh with the rack (see FIGS. 9 and 24C). The pinion is on the end of the output shaft 145 of a reduction gear box 147 mounted on the column, the input shaft 149 of the gear box having a handwheel 151 for turning it to adjust the winder box 121 up or down via the rack and pinion mechanism, gearing in the gear box 147 being such as to maintain the winder box in adjusted position.

A hollow cylindric barrel or drum 153 is rotatable on a vertical axis in the winder box 121. This drum extends from top to bottom of the winder box, having an outwardly extending annular flange 155 at its upper end journaled by means of a bearing 157 in a circular opening 159 in the winder box cover 133 and an outwardly extending annular flange 161 at its lower end journaled by means of a bearing 163 in a circular opening 165 in the bottom of the winder box. A mandrel or coil form assembly generally designated 167 is mounted in this drum, and is held against rotation as will appear hereinafter.

The coil form assembly includes a stepped collapsible coil form generally designated 169 which extends down below the lower end of the drum 153, adapted for the winding of coils of different sizes thereon by a vertical flyer generally designated 171 which rotates with the drum around the axis of the drum. As herein shown, the collapsible coil form is a three-step coil form, for winding coils such as PC1-PC3. The lowest step (the first step) of the form, indicated at 169a, is adapted for the winding thereon by the flyer of a coil such as PC1, which is the smallest of the three coils of the set. The next step up (the second step), indicated at 169b, is adapted for the winding thereon by the flyer of the intermediate size coil such as PC2. The upper step (the third step), indicated at 169c, is adapted for the winding thereon by the flyer of the largest coil such as PC3.

A ring gear 173 is secured on the top of the lower flange 161 of the drum 153 surrounding the drum. A gear housing 175 is mounted on the outside of sidewall 127 of the winder box 121 adjacent the bottom of the box. A hydraulic motor 177 is mounted in vertical position on the bottom of the gear housing 175 with its output shaft 179 extending up into the gear housing. A gear 181 is keyed on the shaft in housing 175 and meshes with the gear 173 on the drum 153 through a slot 183 in wall 127 of the winder box for driving the drum.

The flyer 171 comprises an upper tube 185 and a lower tube 187 telescopically slidable on the upper tube. The upper tube 185 has its upper end portion secured in a vertical hole 189 in the upper end flange 155 of the drum 153 and extends down from this flange toward the lower end of the drum on the outside of the drum. The lower tube 187 has its upper end secured in the inner race of a ball bearing 191 carried by a vertically movable flyer traverse carriage 193, and extends down from this carriage through a vertical hole 195 in the lower end flange 161 of the drum. The lower tube 187 is vertically slidable in the hole 195, and has a bell mouth 197 at its lower end. The arrangement is such that, on rotation of the flyer tubes 185 and 187 with the drum around the vertical axis of the drum, the wire (e.g., PW) extending down through the tubes and attached to the coil form 169 is wound around the coil form and, by imparting vertical movement to the lower flyer tube 187 via vertical movement of the carriage 193, the wire may be traversed relative to the coil form for winding on its three steps and level wound on each step. This level winding may be what is referred to as precision winding in which, as to each step of the coil form, the wire is wound in single turns so that each coil is a single-turn-layer coil.

The flyer traverse carriage 193 comprises a yoke 199 mounted for vertical sliding movement on a pair of vertical guide rods 201 which extend between the cover 133 and bottom 123 of the winder box 121. The yoke has linear bearings 203 slidable on the rods. It is located between the drum 153 and the backwall 125 of the box and carries a ring 205 surrounding the drum with an annular space between the drum and the ring. The ring constitutes an annular track for the outer race of the ball bearing 191, having an internal annular groove 207 receiving the outer race. The drum has a vertical slot 209 accommodating the ball bearing. The ball bearing rotates with the drum around the vertical axis of the drum, the outer race of the ball bearing being in rolling contact with the ring in the groove 207, and rotating on the vertical axis of the ball bearing.

The flyer carriage 193 is adapted to be moved upward for traversing the lower flyer tube 187 upward for level winding coils on the coil form 169 by means indicated generally at 211. This means comprises a pair of lead screws 213 and 215 extending vertically between the cover 133 and bottom 123 of the winder box 121 between the yoke 199 of the flyer carriage and the backwall 125 of the winder box. These lead screws are located closely adjacent one another on opposite sides of the vertical central plane of the winder box which bisects walls 125 and 131 of the winder box. Their lower ends are journaled in bearings indicated at 217 in the bottom wall 123 of the winder box. They extend up above the cover of the winder box, being journaled in bearings such as indicated at 219 in the cover 133 of the winder box. The lead screws are adapted to be rotated in opposite directions by means indicated generally at 221 driven by the hydraulic motor 177. This means includes a vertical shaft 223 extending up from the output shaft 179 of the hydraulic motor through the top of the gear housing 175 and journaled in a bearing 225 mounted on the outside of wall 127 of the winder box above the gear housing 175. A belt and pulley drive 227 connects the upper end of the shaft to the input shaft 229 of an adjustable variable speed drive 231 mounted on the outside of wall 127 adjacent the top of the winder box. The output shaft 233 of the variable speed drive 231 extends up above the top of the winder box and is connected via a belt and pulley drive 235 to the lead screw 213. A gear 237 on the upper end of lead screw 213 meshes with a gear 239 on the upper end of lead screw 215 so that these screws, when driven rotate in opposite directions.

The flyer carriage 193 is adapted to be traversed upward either by engagement of a first follower nut 241 carried by the carriage with the first lead screw 213 or by engagement of a second follower nut member 243 with the second lead screw 215. The first follower 241 is horizontally slidable into and out of engagement with screw 213 in a guide 245 mounted on the back of yoke 199, and adapted for actuation by an air cylinder 247 mounted on the back of the yoke. Similarly, the second follower 243 is horizontally slidable into and out of engagement with screw 215 in a guide 249 mounted on the back of the yoke, and adapted for actuation by an air cylinder 251 mounted on the back of the yoke.

At the start of winding a first set of three coils (e.g., set P1, comprising coils PC1–PC3) on the three-step coil form 169 at winding station WS1, the flyer carriage 193 of the coil winding and transfer mechanism 17A at station WS1 occupies a lowered starting position wherein the bell mouth 197 at the lower end of the lower flyer tube 187 is at an elevation somewhat above the elevation of the lower end of the coil form. The wire PW to be wound into the coils around the coil form extends from a supply in a container alongside the apparatus through an air-cylinder-actuated tension unit 253 around the guide roller 255, through an air-cylinder-actuated wire eyelet 257 (see particularly FIG. 24B) and thence down through the flyer tubes 185 and 187, its lower end portion extending laterally from the bell mouth over to the lower step of the coil form 169a. During the winding of a set of coils, the eyelet 257 is coaxial with the drum 153, but is retracted after winding of the set of coils has been completed, as will appear.

The hydraulic motor 177 is set in operation to rotate the drum 153 in one direction via the gears 181 and 173 for winding the first set of coils P1 on the coil form. It may be assumed that this direction is counterclockwise, for example, as viewed from above. The flyer 171, being carried by the drum, rotates counterclockwise with the drum and the wire is accordingly wound in counterclockwise direction around the lower step 169a of the coil form. The lead screws 213 and 215 are driven from the hydraulic motor 177 via the lead screw drive 221. This drive is such that the first screw 213 is driven clockwise, and the second screw 215 is driven counterclockwise. The first air cylinder 247 is actuated to engage the follower 241 with the clockwise-rotating first lead screw 213 for traversing the flyer carriage 193 and the lower flyer tube 187 upward for level winding the wire on the coil form. The second follower 243 is maintained in retracted position out of engagement with the second lead screw 215. After the three-coil set P1 has been wound on the coil form with the requisite number of turns, the hydraulic motor 177 is stopped and this set of coils is transferred to the placer head at station WS1 as will appear. The flyer carriage 193 and the lower flyer tube 187 are moved back downward to starting position for starting the winding of the second three-coil set P2. The hydraulic motor 177 is set in operation to rotate the drum 153 in clockwise direction (opposite to the direction of winding set P1), and the flyer 171 is thus rotated clockwise for winding the second set. With the hydraulic motor drive so reversed, the first lead screw 213 is driven counterclockwise and the second lead screw 215 is driven clockwise. The second air cylinder 251 is actuated to engage the follower 243 with the clockwise rotating second lead screw 215 for traversing the carriage 193 and the lower flyer tube 187 upward for level winding the wire on the coil form, the first follower 241 being maintained in retracted position out of engagement with the first lead screw 213. After the second three-coil set P2 has been wound on the coil form with the requisite number of turns, the hydraulic motor 177 is stopped and set P2 is transferred to the placer head at station WS1. The carriage 193 and lower flyer tube 187 are moved back downward to starting position for winding the third three-coil set P3. This is wound in the same mode as the first set P1 and transferred to the placer head at station WS1; then the fourth three-coil set P4 is wound in the same mode as set P2 and transferred.

Mounted on top of the winder box 121 is a casting generally designated 259 (see FIGS. 1, 16–18 and 24A) formed to provide a platform 261 on legs 263 and 265 extending up from a base 267. The base is secured on the winder box cover 133. A hydraulic cylinder 269 has its lower end secured in a hole 271 in the platform and extends up from the platform. A piston rod 273 extends down from a piston (not shown) in the cylinder through the hole 271. A first pusher 275 is secured to the lower end of the piston rod below the platform and is movable down toward the winder box and up away from the winder box by the cylinder 269. The pusher comprises a tubular stem 277 having a circular head 279 at its upper end, the stem having a reduced-diameter lower end extension 281. The lower end of the piston rod 273 is threaded in the upper end of the bore of the stem. Rods 283 secured at their lower ends in head 279 of the pusher extend up through guide openings 285 in the platform, acting to guide the pusher for vertical movement.

A second pusher 287 comprises a tubular stem 289 slidable on the stem 277 of the first pusher 275 having a circular head 291 at its upper end below the head 279 of the first pusher. The stem 289 has an outwardly extending annular flange 292 at its lower end. Two hydraulic cylinders each designated 293 are mounted on the head 279 of the first pusher 275, each having its lower end secured in a hole 295 in the head 279 and extending upward therefrom through a slot 297 in the platform 261, these two cylinders and their respective slots being located on diametrically opposite sides of the cylinder 269. Piston rods 298 extend down from pistons (not shown) in cylinders 293 to connections with the second pusher 287. Rods 299 and 300 secured at their lower ends in the head 291 of the second pusher 287 extend up through holes 301 in the head of the first pusher 275 and through holes 303 in the platform 261. The second pusher 287, when moved upward to a raised retracted position, engages spring-biased bumpers 305 slidable in holes 307 in the platform, the head 279 of the first pusher 275 having openings 309 accommodating these bumpers.

A rod 311 has its lower end secured to the flyer carriage 193 and extends up through aligned holes in the winder box cover 133 and base 167 of casting 259, having an enlarged-diameter upper end portion 313 slidable in a hole in platform 261. An arm 315 is clamped on this rod adjacent its upper end. This arm has a hole 317 adjacent its free end slidably receiving the rod 300. The latter has a collar 319 on its upper end above the arm 315. Rod 311 moves upward with the flyer carriage when the latter is traversed upward for level winding the wire to the raised position in which it is illustrated in FIG. 24A. Rod 300 occupies the raised position in which it appears in FIG. 24A when the pusher 287 is raised and in that position of rod 300, the collar 319 at its upper end is spaced well above the arm 315. When the pusher 287 is driven downward, collar 319 comes into engagement with the arm 315, after a lost motion interval, and then, on continued downward movement of the pusher 287 and rod 300, the rod 311 is driven downward to drive the flyer carriage 193 downward to its lowered starting position. Whichever one of the lead screw followers 241, 243 that was in engagement with its respective lead screw is retracted before the downward return of the flyer carriage takes place, and, in order to prevent the carriage from sliding rapidly downward on guide rods 201 on retraction of the followers, the weight of the carriage is counterbalanced by an air cylinder system comprising an air cylinder 321 extending up from the base 267 adjacent a corner thereof having a piston rod 323 extending down from a piston (not shown) in the cylinder to a connection at its lower end with the carriage. A spring bumper system such as indicated at 325 is provided for cushioning the carriage as it reaches its starting position.

The mandrel or coil form assembly 167 (FIGS. 6 and 7) comprises a vertical elongate open-ended hollow cylinder 327 which is not to rotate. It has an outside diameter smaller than the inside diameter of the rotatable drum 153 and is mounted in the drum (153 in bearings 329). The cylinder 327 extends to some extent out of the upper end of the drum 153 and has a gear 333 secured at its upper end. This gear 333 constitutes the central or sun gear of an epicyclic or planetary gear train 335. This train comprises an outer stationary internal ring or orbit gear 337 secured on top of the winder box cover 133. A gear train 335 connects gears 333 and 337. This train is mounted on the upper end of the drum 153. It includes a gear 339 in mesh with the stationary orbit gear 337. Gear 339 is clustered with a pinion gear 341 which meshes with a gear 343, the latter meshing with the sun gear 333 on the cylinder 327. The gear tooth ratios are such that the cylinder 327, while in effect floating in the bearings 329 within the drum 153, is maintained stationary within the drum 153 despite rotation of the latter. In other words, the gear train 335 carried around with the drum 153 rolls the pitch line of gear 339 on the stationary pitch line of orbit gear 337, the speed ratio of train 335 being such that the pitch line of gear 343 rolls around the pitch line of gear 333 without turning the latter and moreover preventing it from rotating.

A head 345 is secured in the lower end of the cylinder 327. This head has an elongate slot 347 extending therethrough from top to bottom offset from and parallel to a diametrical plane of the head. On the side of slot 347 toward this plane is a shorter slot 349 which opens into slot 347, the two slots forming a generally T-shaped opening through the head. The stepped collapsible coil form 169 comprises a fixed section generally designated 351 and a collapsible section generally designated 353 extending down from the head 345. The fixed section comprises an inner member 355 and a pair of outer members each designated 357, these members extending down from the head 345 and having their upper ends secured to the head. The inner member 355 has a flat inside face 358 and a generally concave serrated outside face 359 and is secured to the head with its flat inside face coplanar with the outside of the elongate slot 347 in the head. It has a relatively narrow lower section 361, an intermediate section 363 wider than the lower section, and an upper section 365 wider than the intermediate section. The outer members 357 are spaced outward from the concave outside face 359 of the inner member 355 and spaced laterally to provide a slot 367 therebetween, this slot being in line with a slot 369 in the head. Each outer member 357 has a relatively narrow thin lower section 371, an intermediate section 373 wider and thicker than the lower section, and an upper section 375 wider and thicker than the intermediate section.

The collapsible section 353 of the coil form comprises an arm 377 pivoted at 379 in the slot 349 in the head 345 and extending down from the head 345 spaced from the inside face 358 of inner member 355 of the fixed foil form section 351. Secured on the outside of the arm 377 is a three-section coil form member 353 having a relatively narrow lower section 383, an intermediate section 385 wider and thicker than the lower section, and an upper section 387 wider and thicker than the intermediate section. The arm 377 has a roller 389 at its lower end engageable with a slide plate 391 which is vertically slidable in the slot 347 in the head 345. A coil compression spring 393 reacts against the arm from a cap 395 secured in a recess 397 in the top of the head 345 to bias the arm to swing toward the fixed coil form section 351 for collapse of the collapsible coil form section 353, the slide plate normally occupying a raised retracted position wherein roller 389 engages the opposed face of the slide plate to hold the collapsible section in an expanded position for winding coils on the coil form. The slide plate is movable downward from its raised retracted position to a lowered position wherein roller 389 drops into a pocket 399 in the slide plate for collapse of the collapsible section 353 under the bias of spring 393.

A tube 401 has its lower end seated in a recess 403 in the cap 395 and extends up from the head 345 on the vertical axis of the cylinder 327 to a point somewhat above midheight of the cylinder. An annular slider 405 is slidable in the cylinder on this tube 401 from a raised retracted position at the upper end of the tube to a lowered position shown in phantom in FIG. 7 adjacent the lower end head 345 of the cylinder. The slider has radial slots 407 at its periphery receiving longitudinal splines 409 extending radially inward from the wall of the cylinder 327. The opening 411 in the slider is dimensioned for a sliding fit on the tube 401. A second tube 413 extends up from the slider 405 on the vertical axis of the cylinder 327. This second tube is dimensioned for a telescopic sliding fit on the first tube 401. It has a head 415 threaded in its upper end. A coil compression spring 417 extends vertically in the tubes 401 and 413 from the cap 395 on the lower cylinder end head 345 to the head 415 of the upper tube to bias the upper tube to slide upward to a raised retracted position wherein it extends up out of the open upper end of the cylinder 327. The second tube 413 has its lower end fitted in a fitting 419 on the top of the slider 405. It extends through a second annular slider 421 above the first slider 405, this second slider 421 being slidable in the cylinder 327 from a raised retracted position adjacent but spaced somewhat down from the upper end of the cylinder and a lowered position just above the lowered position of the first slider 405. The second slider 421 has radial slots 423 at its periphery receiving the longitudinal splines 409.

Coils wound on the coil form 169 are adapted to be stripped therefrom and transferred to a placer head by stripping means associated with the second or upper slider 421. This stripping means comprises an elongate relatively narrow flat stripper bar 425 and a pair of elongate relatively wide flat stripper bars each designated 427 extending down from the upper slider 421 through the lower slider 405 and the lower end head 345 of cylinder 327 into the coil form. The narrow stripper bar 425 has its upper end received in a vertical slot 431 (see FIG. 7) in the slider 421 and is notched out to key it to this slider as indicated at 433. It extends down from the upper slider 421 through a vertical slot 435 in the lower slider 405 and the slot 369 in the head in line with the slot 367 between the outer members 357 of the fixed section 351 of the coil form, and has a notch 437 in its lower end. The wide stripper bars 427 are coplanar in a plane at right angles to the narrow stripper bar 425. Each has its upper end received in a vertical slot 439 in the upper slider and is notched out to key it to the upper slider as indicated at 441. The wide stripper bars 427 extend down from the upper slider through vertical slots 443 in the lower slider 405 and through the slot 347 in the head 345 at opposite sides of the coil form. Each wide stripper bar has a notch such as indicated at 447 in its lower end. When the upper slider 421 is in its raised retracted position, the lower ends of the stripper bars are located at the upper end of the coil form. On downward movement of the upper slider, the stripper bars are driven downward, the bar 425 moving downward in the slot 367 between the outer members 357 of the fixed section of the coil form, the bars 427 moving downward between the inner member 355 of the fixed section 351 and the collapsible section 353 at opposite sides of the coil form.

Figure 15A:
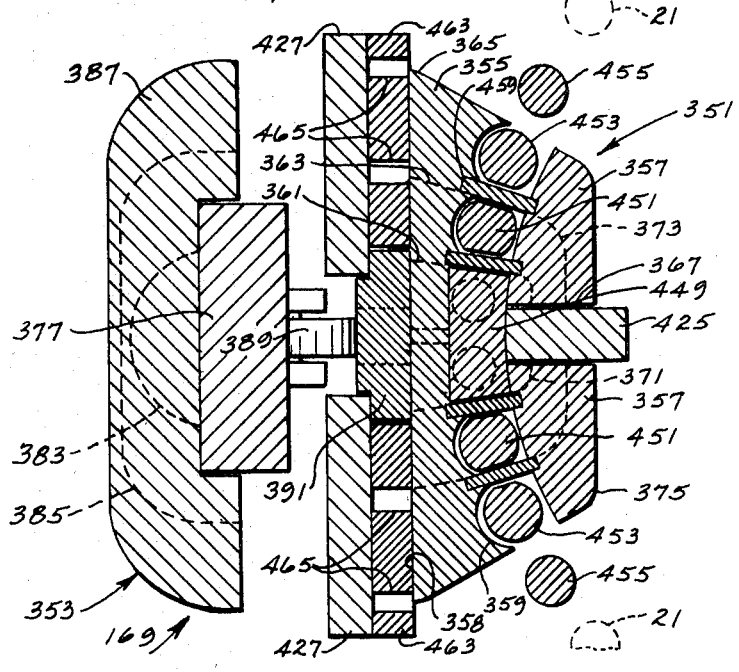
FIG. 15A is an enlarged section generally on line 15A—15A of FIG. 7.

Associated with the lower slider 405 and extending downward therefrom through the head 345 into the coil form 169 is a set of guide members, comprising a relatively wide central guide bar 449, a first pair of inner guide pins, each designated 451, on opposite sides of the bar 449, a second pair of guide pins, each designated 453, on the outside of the pins 451, and a third pair of guide pins, each designated 455, on the outside of the pins 453. Each of the guide pins is secured at its upper end in the lower slider 405 and extends down therefrom through a respective hole such as indicated at 457 in the head 345. The guide bar 449 is slidable between the inner and outer members 355 and 357 of the fixed coil form section 352, centered widthwise with respect to said members. The pins 451 and 453 of the first and second pairs of pins are slidable between these members, and the pins 455 of the third pair are located outward of the sides of said members. Partitions such as indicated at 459 in FIG. 15A are provided between the sides of bar 449 and pins 451 and between pins 451 and pins 453. When the lower slider 405 is in its raised retracted position, the lower ends of the guide pins 451, 453 and 455, which are recessed as indicated at 461 for mating with the upper ends of fingers 21 of a placer head, are located just below the lower end head 345 of cylinder 327. On driving the lower slider down to its lowered position shown in phantom in FIG. 7, the guide pins 451, 453 and 455 are driven down to a position extending down below the lower end of the coil form 169. The guide bar 449, which has a pair of recesses 461 in its lower end is secured to the slide plate 391.

Associated with the lower slider 405 and extending downward therefrom through the head 345 into the coil form 169 are two slotted guide bars each designated 463 slidable in the slot 347 in head 345 in face-to-face relation with the stripper bars 427. Each of the bars 463 has slots 465 extending up from its lower end for receiving side portions of the coils wound on the coil form and confining them in their single-turn layer conformation as the coils are stripped from the form by the stripper bars 425 and 427. Each of the bars 463 has its upper end received in a vertical slot such as indicated at 467 in the lower slider 405 and is notched out to key it to the slider as indicated at 469. When the lower slider 405 is in its raised retracted position, the lower ends of the slotted guide bars 463 are located just below the head 345. On driving the lower slider down to its lowered position, the guide bars 463 are driven down to a position extending down below the lower end of the coil form. Each of the bars 463 has an offset providing an upwardly facing shoulder 471 interengageable with a T-head 473 on the upper end of the slide plate 391. The arrangement is such that the slider 405, in being driven down from its raised retracted position to its lowered position, engages the upper end of the slide plate 391 just before the slider reaches its lowered position and drives the slide plate down the short distance from its raised retracted position to the point where the roller 389 drops into the picket 399 in the slide plate for collapse of the collapsible coil form section. The guide bars 463 move down with the slider 405 and shoulders 471 move away from the T-head 473 on the upper end of the slide plate. When the slide plate 391 moves down, the guide bar 449 also moves down. On retraction of the slider 405 and bars 463, the slide plate remains down so that the coil form section 353 remains collapsed until shoulders 471 on the bars 463 reengage the T-head 473 and drive the slide plate back upward to its raised retracted position for expanding the coil form section, and retracting the guide bar 449.

The pushers 275 and 287 are coaxial with the telescoping tubes 401 and 413 and the cylinder 327 of the coil form assembly 167; thus the downwardly extending stem 277 of the first pusher 275 is aligned with the tubes 401 and 413. Two sets of bearing blocks, each set being designated 475, are secured on the top of the upper slider 421 at opposite sides thereof. Pivoted at 477 in each set is a latch 479 having an upwardly extending arm 481 and an inwardly extending lower arm 483. The upwardly extending arm 481 carries a roller 485 and has inwardly and outwardly extending fingers 487 and 489 at its upper end. The latch is biased to swing outward by a spring 491. The raised retracted position of the upper tube 413 is determined by engagement of the rollers 485 on the latches in an internal annular groove 493 adjacent the upper end of the cylinder 327, above which is another internal annular groove 495 in which fingers 489 are engageable. The bore of the stem 289 of pusher 287 is of larger diameter than the upper tube 413. On retraction of the piston rod 273 of cylinder 269, pusher 287 is raised to the raised retracted position in which it appears in solid lines in FIG. 24A, closely adjacent the bottom of platform 261. Cylinders 293, which have their lower ends fixed in the pusher 287, slide up in the slots 297 in platform 261 during the raising of the pusher 287. Pusher 287 moves up with pusher 275 to the raised retracted position in which it appears in FIG. 24A, directly below pusher 275.

In the raised retracted position of pusher 275, the lower end of its stem 277 is spaced above the upper end of tube 413 a sufficient distance to accommodate the wire eyelet 257. The latter is mounted on the end of a piston rod 497 extending horizontally from a piston (not shown) in an air cylinder 499 mounted on leg 263 of the casting 259. When the piston rod 497 is extended, the eyelet 257 is disposed in operative position coaxial with the drum 153 (and tube 413) between the lower end of stem 277 and the upper end of the tube 413, as shown in phantom in FIG. 24B. On retraction of the piston rod 497, the eyelet 257 is laterally retracted to a position generally in line with the flyer 171 as shown in solid lines in FIG. 24B. The guide roller 255 and tension unit 253 are carried by a bracket 501 mounted on the casting 259, the guide roller being located laterally outward of the pushers 275 and 287 above a point on the circular path of the upper end of the flyer. Air cylinders for actuating the tension unit are indicated at 503 (see also FIG. 26).

The arrangement is such that, with the eyelet 257 retracted, the cylinder 269 may be actuated to drive its piston rod 273 and pusher 275 downward from its raised retracted position. On such downward movement of the pusher 275, it drives pusher 287 down along with it, cylinders 293 sliding down in slots 297 in the platform 261. The lower end of stem 277 of pusher 275, which extends down below the stem 289 of pusher 287, engages the head 415 at the upper end of the upper telescoping tube 413 and drives this tube down against the upward return bias of spring 417, tube 413 sliding down around the fixed lower tube 401. The stroke of cylinder 269 is such that pusher 275 is driven down the distance indicated at A in FIG. 24B to a lowered position wherein the lower end of its stem 277 is entered in the bore of the upper annular slider 421, and pusher 287 is simultaneously driven down this same distance to an intermediate position wherein the lower end of its stem 289 engages the lower arms 483 of latches 479 and swings these latches inward to retract the latch fingers 489 from the groove 495 in the cylinder 327. On the downward movement of the upper telescoping tube 413, the lower slider 405 is driven downward to its lowered position shown in phantom in FIGS. 7 and 24B, and thus the guide bars 463 and the guide pins 451, 453 and 455 are driven down to their operative position extending down below the lower end of the coil form 169. Cylinders 293 may then be actuated to drive piston rods 298 and pusher 287 farther downward (pusher 275 remaining in its aforesaid lowered position). The stroke of cylinders 293 is such that pusher 287 is driven down (sliding down on tube 413) the distance indicated at B in FIG. 24B to its fully lowered position shown in phantom in FIGS. 7 and 24B, and thus the stripper bars 425, 427 and 429 are driven down for stripping the coils from the coil form 169.

The pusher 287 is returned to its aforesaid intermediate position by upward retraction of piston rods 298 in their cylinders 293. On this upward return movement of the pusher 287, its lower end flange 292 engages the inwardly extending fingers 487 of latches 479 on the upper slider 421 and drives the upper slider 421 back up to its raised retracted position, the slider moving up with the pusher 287 to the point where rollers 485 drop into the groove 493 and fingers 489 drop into the groove 495 for relatching the upper slider and clearing fingers 487 from the flange 292. Then, piston rod 273 of cylinder 269 is retracted and this results in upward return movement of pusher 275 to its raised retracted position and accompanying upward return of pusher 287 to its raised retracted position since pusher 287 is in effect locked to pusher 275 via the cylinders 293. On retraction of pusher 275, the upper telescoping tube 413 is returned upward by spring 417 to raised retracted position and this pulls slider 405 back up to its raised retracted position.

An open rectangular frame 505 (FIG. 24C) extends down from the bottom 123 of the winder box 121 spaced laterally outward from the collapsible section 353 of the coil form 169. A carriage 507, referred to as the wire clamp carriage, is vertically slidable on a pair of guide rods 509 extending between the top and bottom of the frame. A plate 511 is secured to the bottom of the carriage 507 extending in the direction toward the coil form, with suitable provision for adjustment of the plate toward and away from the coil form. Mounted on this plate at its inner end adjacent the coil form are two wire clamp units 513 and 515, each comprising a fixed jaw 517 and a movable jaw 519 actuated by an air cylinder 521 and adapted for clamping the wire between these jaws. Each clamp unit includes a cylinder mount having an elongate flat head 523 with a notch 525 in one end thereof and a pair of legs 527 extending down from the head at its said end on opposite sides of the notch. The cylinder 521 is mounted underneath the head 523 and has a piston rod 531 extending from a piston therein (not shown) through the space between the legs 527. The movable jaw 519 is attached to the end of the piston rod, extending up through the notch 525. The fixed jaw 517 is secured to the top of the head 523 at the closed end of the notch. The two cylinders 521 are arranged with their axes at an angle converging toward the coil form, and with the clamp jaws 517 and 519 at the inner end of plate 511 closely adjacent the coil form. A air cylinder 533 is mounted in vertical position extending down from the bottom of the frame 505. A piston rod 535 extends up from a piston (not shown) in this cylinder through the bottom of the frame to a connection at 537 with the wire clamp carriage 507. A rod 539 extends down from the flyer carriage 193 through a hole in the bottom 123 of the winder box 121 and the top of frame 505 for interengagement with the wire clamp carriage 507. When the flyer carriage 193 moves down to its lowered starting position, rod 539 drives the wire clamp carriage 507 down to an intermediate position wherein the clamp jaws 517 and 519 are somewhat above the lower end of the coil form 169. Cylinder 533 is then operable to pull the carriage 507 farther downward to a lowered position.

Associated with each winder box 121 is a horizontally disposed U-shaped frame 541 carrying two oppositely disposed wire holder units 543 and 545. The crossbar of the U-shaped frame is designated 547, and its sides are designated 549 and 551. A pair of guide rods 553 extend up from the crossbar 547 and are slidable in holes 555 in two vertically spaced bars 557 and 559 mounted on the outside of the front wall 131 of the winder box. An adjusting screw 561 is provided for holding the frame 541 in vertically adjusted position relative to the winder box 121, this screw having its lower end rotary in a hole 563 in the crossbar 547 and its upper end threaded in a tapped hole 565 in the lower bar 557 on the front wall of the winder box, and being provided with a knob 567 for turning it in one direction or the other to raise or lower the frame. The latter is located at an adjusted elevation just above the lower end of the coil form 169 with the sides 549 and 551 of the frame extending inward on opposite sides of the coil form.

The wire holder unit 543 is carried by side 549 of the U-shaped frame 541, and the other wire holder unit 545 is carried by the other side 551 of this frame. Each wire holder unit comprises an air cylinder 569 having its forward end secured to a bracket 571 by means of which it is mounted in position below the respective side of the frame in angled relation thereto. A piston rod 573 extends from a piston (not shown) in the cylinder and has a clamp jaw 575 on its forward end having a tip 577 which may be made of a suitable plastic such as nylon. Extending back from the jaw are a long rod 579 and a short rod 581. The long rod 579 has a collar 583 secured thereon adjacent its rearward end, rearward of the rearward end of the short rod. The collar and the short rod are for actuating a switch 585 mounted on a bracket 587 secured to the respective side of the frame. The jaw 575 of clamp unit 543 is movable inward by means of the respective cylinder from a retracted position toward one side of the fixed section 351 of the coil form 169 for clamping the wire against the coil form, and the jaw 575 of the other unit 545 is similarly movable inward from a retracted position toward the other side of the fixed section of the coil form for clamping the wire against the coil form.

Figure 20:
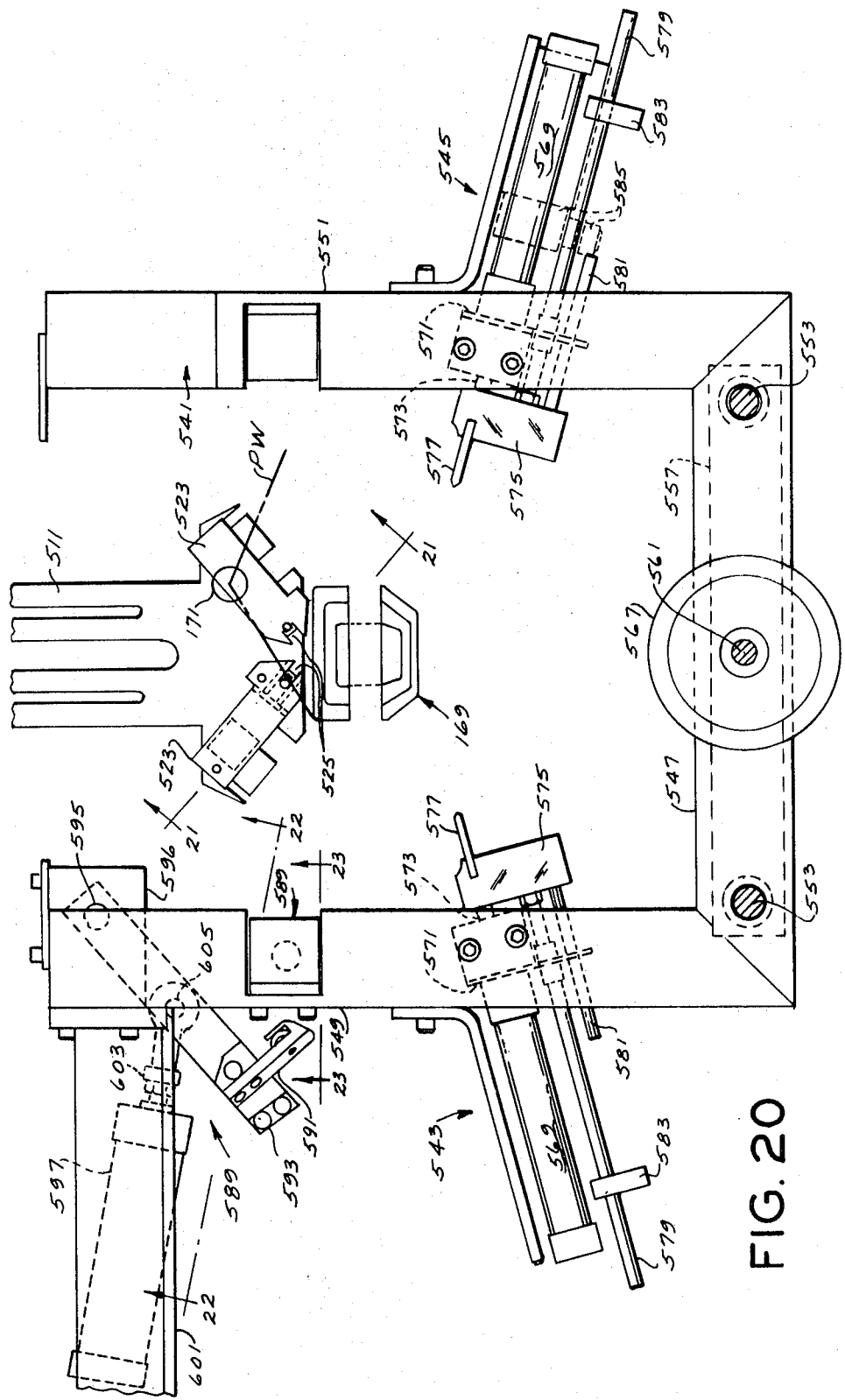
FIG. 20 is a horizontal section on line 20—20 of FIG. 19.
Figure 21:
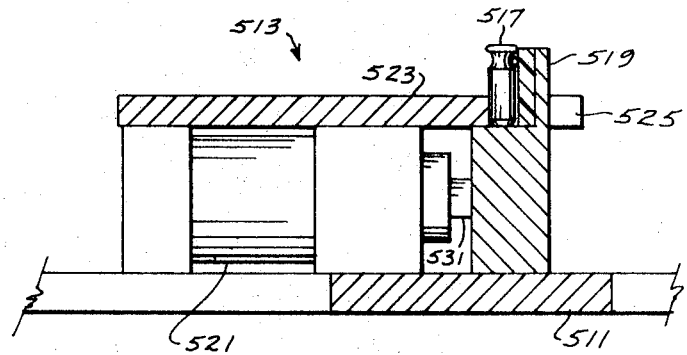
FIG. 21 is an enlarged vertical detail section on line 21—21 of FIG. 20.
Figure 23:
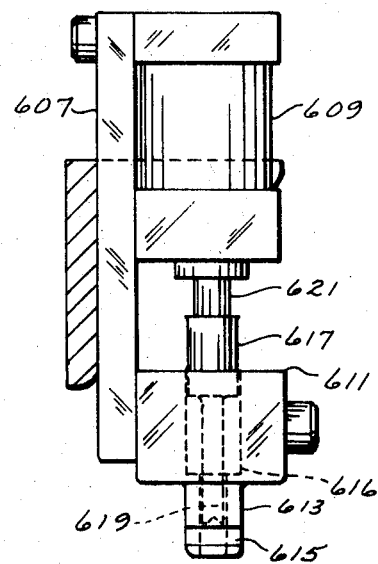
FIG. 23 is a vertical section on line 23—23 of FIG. 20.

Adjacent the end of side 549 of the U-shaped frame 541 is a lead puller and wire cutter unit generally designated 589 comprising a hook-shaped lead puller 591 on an arm 593 pivoted at 595 in a block 596 on the side of the frame. An air cylinder 597 pivoted at 599 on a bracket 601 extending laterally outward from the side of the frame has a piston rod 603 extending from a piston therein (not shown) to a pin connection at 605 with the arm for swinging the latter between the retracted position in which it is shown in FIG. 20 and an extended position. When the lead puller 591 is swung inward, it is adapted to hook onto the reach of wire extending from the lower end of the flyer 171 to the coil form 169 and pull the wire back to pull out a lead and to bring the wire into the wire cutter of the unit 589. The wire cutter comprises a vertical plate 607 secured to the side of the U-shaped frame, an air cylinder 609 mounted in vertical position on the inside face of the plate 607 adjacent the upper end of the plate and a cutter body 611 mounted on the inside face of the plate below the cylinder. The cutter body 611 has a downward tubular extension 613 provided with a lateral slot 615 intersecting the bore in the extension, with a counterbore 616 in the body at the upper end of the bore of the extension. A punch 617 has a stem 619 slidable in the bore in the extension and is secured to the lower end of piston rod 621 extending down from a piston (not shown) in cylinder 609, the upper part of the punch being slidable in the counterbore 616. The lead puller 591 is adapted to pull the wire into the slot 615 and the punch 617 is then adapted to be driven downward by the cylinder 609 to cut the wire.

Figure 25:
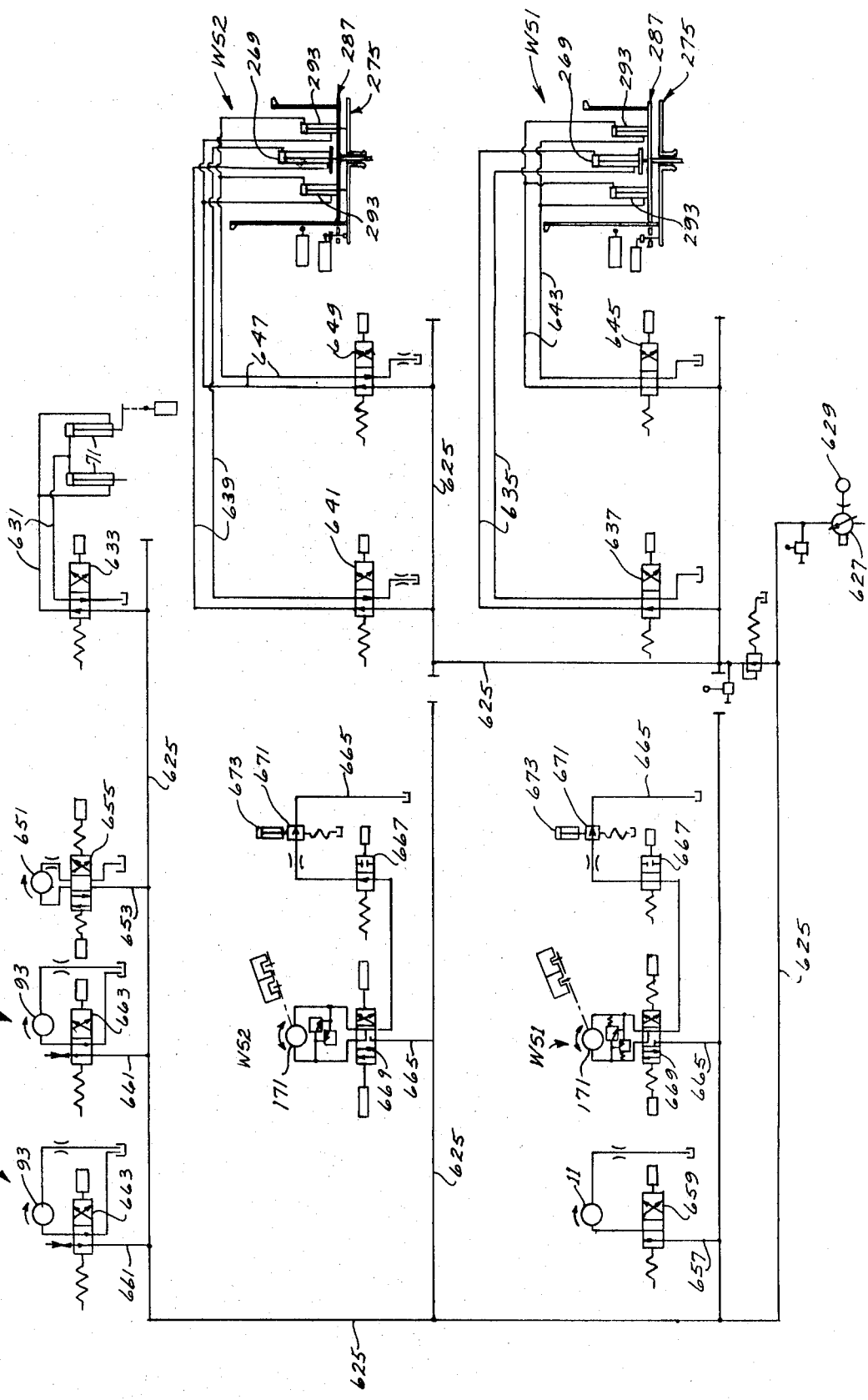
FIG. 25 is a hydraulic circuit diagram.

FIG. 25 shows the hydraulic circuit for the apparatus, which includes a hydraulic pressure supply system 625 fed by a hydraulic pump 627 powered by an electric motor 629. The hydraulic cylinders 71 of the stator clamp units 59 are connected in this system a indicated at 631 under control of a solenoid valve 633, the arrangement being such that when this valve is energized, the stator clamp jaws 75 are driven downward and swung around to clamp a stator on the placer head at the placing station, and, when the valve is deenergized, the stator clamp jaws are raised and retracted. The hydraulic cylinder 269 at station WS1 is connected in this system as indicated at 635 under control of a solenoid valve 637, the arrangement being such that when this valve is energized, the piston rod 271 of this cylinder 269 is driven downward and, when the valve is deenergized, the piston rod is retracted to the upper end of its stroke. Similarly, the hydraulic cylinder 269 at station WS2 is connected as indicated at 639 in the system under control of a solenoid valve 641, the arrangement being such that when this valve is energized, the piston rod 271 of this cylinder is driven downward, and when the valve is deenergized, the piston rod is retracted to the upper end of its stroke.

The hydraulic cylinders 293 at station WS1 are connected in the system as indicated at 643 under control of a solenoid valve 645, the arrangement being such that when this valve 645 is energized, the piston rods 298 of these cylinders 293 are driven downward and, when this valve 645 is deenergized, the piston rods 298 are retracted to the upper ends of their strokes. Similarly, the hydraulic cylinders 293 at station WS2 are connected in the system as indicated at 647 under control of a solenoid valve 649, the arrangement being such that when this valve 649 is energized, the pistons 298 of these cylinders 293 are driven downward and, when this valve 649 is deenergized, the piston rods 298 are retracted to the upper ends of their strokes.

By reference to the aforesaid copending application, it will be observed that the coil and wedge driving unit 13 is operated by a hydraulic motor, which is indicated at 651 in FIGS. 24D and 25 herein, and this is connected in the hydraulic system as indicated at 653 under control of a solenoid-actuated reversing valve 655. The arrangement is such that, when the valve is set in one position, the stripper 51 is driven up through the placer head at the placing station and, when the valve is set in its other position, the stripper is driven down back to its lowered retracted position.

The hydraulic motor 11 for indexing the table 1 is connected in the hydraulic system as indicated at 657 under control of a solenoid valve 659, the arrangement being such that when this valve is energized, motor 11 is operated to index the table 1 through 120° via the indexing drive 7. Each of the hydraulic motors 93 for indexing the placer heads at stations WS1 and WS2 is connected in the system as indicated at 661 under control of a solenoid-actuated valve 663, the arrangement being such that, when either of these valves is energized, the respective motor 93 is operated to index the respective placer head 90°. Each of the hydraulic motors 177 for driving the flyer-rotating drums 153 at stations WS1 and WS2 is connected in the system as indicated at 665 under control of a start-stop solenoid valve 667 and a solenoid-actuated reversing valve 669, the arrangement being such that with valve 667 open, motor 177 is operated in one direction or the other according to the setting of valve 669. The hydraulic connection 665 includes a deceleration valve 671 operated by an air cylinder 673.

Figure 26:
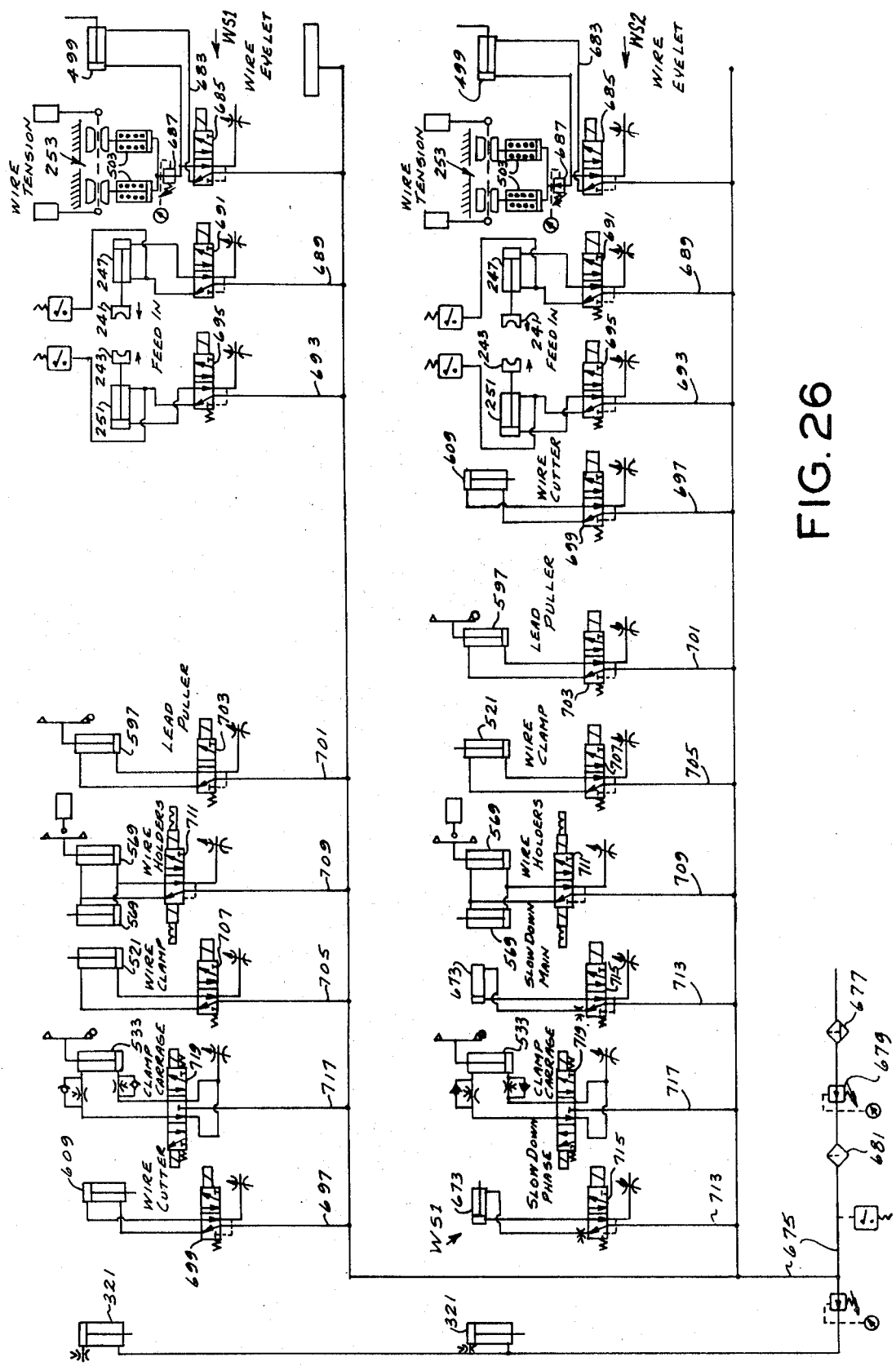
FIG. 26 is a pneumatic circuit diagram.

FIG. 26 shows the pneumatic circuit for the apparatus, which includes a compressed air supply system 675 fed from an air compressor (not shown), via an air filter 677, a pressure regulator 679 and a lubricator 681. As to each of the winding stations WS1 and WS2, the air cylinder 499 for actuating the wire eyelet 257 is connected to the system as indicated at 683 under control of a solenoid valve 685, the arrangement being such that when this valve 685 is energized, the wire eyelet is moved to its operative position and when the valve 685 is deenergized, the wire eyelet is retracted. The air cylinders 503 of the wire tension unit 253 (these cylinders being the spring-return type) are interconnected with 683 via a pressure regulator 687. The air cylinder 247 for actuating the lead screw follower 241 is connected to the system as indicated at 689 under control of a solenoid valve 691, the arrangement being such that, when this valve is energized, follower 241 is moved into engagement with the lead screw 213 and, when the valve is deenergized, follower 241 is retracted. Similarly, the air cylinder 251 for actuating the lead screw follower 243 is connected to the system as indicated at 693 under control of a solenoid valve 695, the arrangement being such that, when this valve is energized, follower 243 is moved into engagement with the lead screw 215 and, when the valve is deenergized, follower 243 is retracted. The air cylinder 609 for actuating the wire cutter punch 617 is connected to the system as indicated at 697 under control of a solenoid-operated valve 699, the arrangement being such that, when this valve is energized, the punch is driven down to cut the wire, and, when the valve is deenergized, the punch is retracted. The air cylinder 597 for actuating the lead puller 591 is connected to the system as indicated at 701 under control of a solenoid-operated valve 703, the arrangement being such that, when this valve is energized, the lead puller 591 is extended and, when the valve is deenergized, the lead puller is retracted. Each of the two air cylinders 521 of the wire clamp units 513 and 515 is connected to the system as indicated at 705 under control of a solenoid-operated valve 707 for operation of either one of the clamp units, the arrangement being such that when either of valves 705 is energized, the respective clamp unit 513 and 515 closes and, when either of the valves is deenergized, the respective clamp unit opens. The air cylinders 569 of both wire holder units 543 and 545 are connected to the system as indicated at 709 under control of a double solenoid valve 711, the arrangement being such that, when one solenoid of this valve is energized, the jaws 575 of both units 543 and 545 are advanced and, when the other solenoid is energized, both jaws are retracted. The aforementioned deceleration valve actuating cylinder 673 is connected to the system as indicated at 713 under control of a solenoid-operated valve 715, the arrangement being such that, when valve 715 is energized, valve 673 is actuated for deceleration of hydraulic motor 171. The air cylinder 533 for the wire clamp carriage 507 is connected to the system as indicated at 717 under control of a double solenoid valve 719, the arrangement being such that when one solenoid of this valve is energized, the piston rod 535 of cylinder 533 is moved up, and when the other is energized, the piston rod moves down.

In a typical operation of the apparatus, four phase windings P1–P4 are wound, one at a time, on the coil form 169 at winding station WS1 and transferred to the placer head, e.g., the head 3A, at station WS1. Then the table 1 is indexed 120° to bring placer head 3A to station WS2, where four main windings M1-M4 are wound, one at a time, on the coil form and transferred at station WS2 to the placer head. Then the table is indexed 120° to bring the placer head 3A to the placing station PS where the eight windings P1-P4 and M1-M4 are placed in the slots C of a stator S applied to the placer head 3A at the placing station. The completed stator is removed, and the table indexed 120° to bring the placer head 3A back to winding station WS1 for repeating the cycle. It will be observed that, while windings are being wound and transferred to head 3A at station WS1, windings are being wound and transferred to head 3B at station WS2, and placement of a set of windings in a stator applied to head 3C is being carried out at placing station PS.

For starting the winding and transferring of the four phase windings P1-P4 at winding station WS1, the solenoid of the wire eyelet control valve 685 is energized and the wire eyelet 257 is in its extended operative position in which it is shown in phantom in FIG. 24B. The wire PW to be wound into the phase windings extends through the wire tension unit 253, around guide roller 255, through the eyelet 257, back to the upper end of the upper flyer tube 185 and down through the latter and the lower flyer tube 187. The wire tension unit 253 is activated as a result of valve 685 being energized. The flyer carriage 193 is in starting position for winding indicated in phantom at 193a in FIG. 24C. The wire clamp carriage 507 is in its aforesaid intermediate position which constitutes its starting position as indicated in phantom at 507a in FIG. 24C. The wire extends out of the lower end of the lower flyer tube and is clamped at its end between the jaws 517 and 519 of one of the clamp units 513, 515 (e.g., unit 513), the respective clamp cylinder 521 being activated for this purpose by energization of the respective valve 707.

The hydraulic motor 177 at station WS1 is set in operation via valves 667 and 669 for rotation of its output shaft 179 in one direction. Assuming that this direction is counterclockwise as viewed from above, drum 153 and flyer 171 are rotated in clockwise direction via gears 181 and 183. Lead screw 213 is driven counterclockwise via drives 227, 231 and 235, and lead screw 215 is driven clockwise via gears 237 and 239. Follower 243 is moved into engagement with the lead screw 215 by actuation of air cylinder 251 via valve 695 for traversing the flyer carriage 193 upward from its starting position 193a. As the flyer carriage 193 moves upward, the lower flyer tube 187 moves upward therewith, telescoping on the upper flyer tube 185 (which does not move vertically). The flyer tube 187, in rotating clockwise with drum 153 and moving upward, effects level winding of the wire on the coil form 169 in single turns.

After a number of turns of the small coil PC1 of the first phase winding P1 have been wound on the lowest step 169a of the coil form 169 (its small step), the two wire holder jaws 575 of the wire holder units 543 and 545 at station WS1 are moved inward by their air cylinders 569 via actuation of valve 711 to clamp the wire against the coil form (see FIG. 24C) and thereby hold it to enable opening of the movable clamp jaw 519 of wire clamp unit 513 for release of the clamp unit from the wire. Air cylinder 521 of unit 513 is then actuated via deenergization of the respective valve 707 to open jaw 519 and release the clamp unit 513 from the wire, following which the wire clamp carriage 507 is moved down out of the way to its full lowered position illustrated in phantom at 507b in FIG. 24C by actuation of air cylinder 533 via valve 719.

The winding of the wire on the coil form 169 to form coils PC1-PC3 of the first phase winding PC then proceeds until the requisite number of turns have been wound. The turns are counted by counting the number of revolutions of shaft 223 via vanes 721 and 723 on this shaft operating in conjunction with photocell pickup 725 and 727. When pickup 725 has counted out a number of turns less than the full number of turns required (e.g., about half the full number of turns), it energizes valve 715 to activate cylinder 673 to actuate the deceleration valve 673 to decelerate the hydraulic winder motor 177, and when pickup 727 has counted out the full number of turns required, it closes valve 667 to stop the motor, hence stopping the rotation of the drum 153 and the flyer 171. When the drum and flyer stop rotating, the lower flyer tube 187 is at the upper end of its vertical stroke as shown in solid lines in FIG. 24C, with a reach of wire between its lower end and the upper step of the coil form 169 in position for being clamped between jaws 517 and 519 of the wire clamp unit 515 when the wire clamp carriage 507 is raised as the next step in the operation.

The wire clamp carriage 507 is then raised by actuation of cylinder 533 via valve 717. After the wire clamp carriage has been raised, the air cylinder 521 of the wire clamp unit 515 is actuated via its respective valve to close jaw 519 of unit 515 to clamp the reach of wire which extends between the lower end of the flyer and the coil form. At this point, the wire eyelet control valve 685 is deenergized, actuating the wire eyelet air cylinder 499 to retract the wire eyelet 257 to clear the way for actuation of the pushers 275 and 287. The valve 711 deenergized to deactuate air cylinders 569 to retract the wire holder jaws 575. Hydraulic cylinder 269 is actuated via valve 637 to drive down both the pushers 275 and 287 in unison, cylinders 293 sliding down in the slot 297 in the platform 261. As the pushers move down, the lower end of stem 277 of the pusher 275 engages the head 415 at the upper end of the upper telescoping tube 413 and drives this tube down against the upward return bias of spring 417. As tube 413 moves down, it drives the lower slider 405 down, and guide bars 449 and 463 and guide pins 451, 453 and 455 are thereby driven down through the coil form 169 to extend down below the lower end of the coil form with their lower ends engaging the upper ends of respective fingers 21 of the placer head 3A at station WS1, and with slots 465 in the guide bars and the spaces between the guide pins lined up with the spaces between said fingers for guidance of the three-step coil wound on the coil form as it is subsequently transferred from the coil form to the placer head 3A. Also, as slider 405 moves down, it engages the slide plate 391 and drives this down to the point where roller 389 drops into the pocket 399 in slide plate 391 for collapse of the collapsible coil form section 353 to enable stripping of the three-step coil from the coil form.

Pusher 287 moves down with pusher 275 to the point where the lower end of its stem 289 has engaged the lower arms of latches 479 and disengaged the latch fingers 289 from groove 495 in cylinder 327. As pusher 287 moves down to this point, rod 300 is pulled down to the point where the collar 319 on the upper end of the rod 300 is ready to engage the arm 315 on the upper end of upper portion 313 of rod 311. After pushers 275 and 287 have been moved down by hydraulic cylinder 269 to drive down the guide bars and guide pins and to effect collapse of the coil form 169 as above described, hydraulic cylinders 293 are actuated via valve 649 to drive the pusher 287 farther downward while pusher 275 and slider 405 remain at the lower end of their stroke. As pusher 287 moves farther downward, it slides down on tube 413 and pushes the upper slider 421 down to drive down the stripper bars 425 and 427 which act to strip the three-step coil from the collapsed coil form 169 and push it down onto the placer head 3A (the coil being guided during this transfer by the guide bars and guide pins 449, 463, 451, 453 and 455 which were previously driven downward). The sides of the three coils of the three-step coil enter the placer head 3A between certain fingers of the head.

The valve 691 is deenergized for actuation of air cylinder 247 to retract the follower 243 from lead screw 215 prior to actuation of hydraulic cylinders 293 to drive the pusher 287 down, thus freeing the flyer carriage 193 for being driven back down to its starting position. When the pusher 287 is driven down by hydraulic cylinders 293, it pulls rod 300 down, and collar 319 at the upper end of rod 300 engages arm 315 at the upper end of portion 313 of rod 311 to drive the latter down to return the flyer carriage 193 and the lower flyer tube 187 to starting position. As the flyer carriage is driven back down to its starting position, rod 539 extending down from the flyer carriage drives the wire clamp carriage 507 back down to its intermediate position 507a, valve 719 for air cylinder 533 being deenergized to vent the lower end of the cylinder to permit this. Thus, the clamp units 513 and 515 are moved down in unison with the stripper bars 425 and 427 and the lower flyer tube 187. The reach of wire between the lower end of flyer tube 187 and the coil being stripped from the coil form is gripped between jaws 517 and 519 of clamp unit 515, and thus is pulled down as the coil is stripped from the coil form and transferred to the placer head 3A. Hydraulic cylinders 293 are actuated via deenergization of valve 645 to retract the pusher 287, pulling it up until it meets pusher 275, and then hydraulic cylinder 269 is actuated via deenergization of valve 637 fully to retract both pushers. As pusher 287 moves upward, it pulls the upper slider 421 and stripper bars 425 and 427 back up to their raised retracted position, and is released from the upper slider via outward swing of latches 479 as permitted by entry of fingers 489 in groove 495 in the cylinder 327. As pusher 275 moves upward, it allows tube 413 to rise, and slider 405 returns upward to retract the guide bars 449 and 463 and the guide pins 451, 453 and 455. As bars 463 move upward, they pull slide plate 391 upward and this expands section 353 of the coil form 169.

With the winding and transfer of the first phase winding P1 to the placer head 3A completed as above described, the wire eyelet 257 is extended by actuation of the wire eyelet air cylinder 499 and the winding of the second phase winding P2 proceeds in the same manner as described above for the first phase winding P1, except that the flyer drum 153 and flyer 171 are rotated in counterclockwise direction instead of in clockwise direction, meaning that lead screw 213 is driven clockwise and lead screw 215 is driven counterclockwise, and the follower 241 is moved into engagement with lead screw 213 by actuation of air cylinder 241 via valve 691 for traversing the flyer carriage 193 upward from its starting position 193a. After wire holder units 543 and 545 have been actuated, the air cylinder 521 of clamp unit 513 is actuated as before via deenergization of the respective valve 707 to open the jaw 519 and release the clamp unit from the wire, and the wire clamp carriage 507 is moved down out of the way to its full lower position illustrated in phantom at 507b in FIG. 24C to enable indexing of the placer head 3A to receive the next phase winding P2. The placer head 3A is then indexed 90° (i.e., rotated 90° on its vertical axis) by operation of the placer head indexing means 89A at winding station WS1, involving operation of the hydraulic motor 93 of means 89A to drive the respective key 103, which is engaged in the coupling element 87 on the lower end of shaft 85 for pinion 83 associated with placer head 3A, thereby rotating pinion 83 and hence rotating the placer head ring gear 43. This positions the placer head 3A for receiving the second phase winding P2 90° around from the previously transferred first phase winding P1. After this indexing of the placer head 3A, and the completion of winding of the second phase winding P2, the latter is transferred from the coil form 169 to the placer head in the same manner as above described for phase winding P1.

The winding of the third phase winding P3 then proceeds in the same manner as above described for phase winding P1, i.e., it is wound clockwise the same as P1. During the winding of the third phase winding P3, after the wire clamp carriage 507 has been moved down to its full lowered position 507b, the placer head 3A is indexed another 90° on its vertical axis to position it for receiving the third phase winding 90° around from the second phase winding P2, and thereafter the third phase winding is transferred to the placer head 3A.

The winding of the fourth phase winding P4 then proceeds in the same manner as above described for the second phase winding P2, i.e., it is wound counterclockwise the same as P2. During the winding of the fourth phase winding P4, after the wire clamp carriage 507 has been moved down to its full lowered position 507a, the placer head 3A is indexed another 90° on its vertical axis to position it for receiving the fourth phase winding 90° around from the third phase winding P3, and thereafter the fourth phase winding is transferred to the placer head 3A. After the fourth phase winding P4 has been transferred to the placer head 3A, the wire clamp carriage 507 is moved down as before to its 507b position, but this time the wire is retained clamped between the jaws 517 and 519 of one of the clamp units 513 or 515 so that there is an inclined reach of wire extending between these jaws and the lower end of the flyer 171. Then, the lead puller valve 703 is actuated to operate the lead puller cylinder 597 to swing the lead puller 591 inward and then back outward. As the lead puller 591 swings in, it hooks onto the stated inclined reach of the wire and, as it swings out, it pulls the wire back (pulling the wire down out of the flyer) and brings the wire into the slot 615 of the wire cutter 589. The wire cutter cylinder valve is then actuated to operate the punch 617 of the wire cutter to cut the wire, leaving a lead of the wire extending from the four phase windings P1–P4 now carried by the placer head 3A, and a lead of wire extending from the wire clamp unit to the cutter to constitute a lead for the next set of four phase windings to be wound. The cutting operation occurs after winding of another phase winding P1 on the coil form 169 at station WS1 has started, and, more particularly, after a few turns have been wound and the wire holder jaws 575 have been extended to hold the turns.

Following the operation of cutting the wire, the table 1 is indexed clockwise 120° by operation of the table indexing drive unit 7 to advance the placer head 3A (carrying the four phase windings P1–P4) from the winding station WS1 to the winding station WS2. At the latter station, the four main windings M1–M4 are wound and transferred to the placer head 3A in the same manner as above described for the phase windings, the successive main windings being transferred to the placer head at 90° intervals (and at 45° intervals in regard to respective phase windings). When the wire MW from which the main windings are wound has been cut, the table 1 is indexed another 120° to advance the placer head 3A (now carrying the four phase windings P1–P4 and the four main windings M1–M4) to the placing station PS. Here, a stator S is applied to the fingers of the placer head 3A, the stator clamps 59 actuated to clamp the stator on the fingers, and the windings are placed in the stator slots via operation of the hydraulic motor 651 of the coil and wedge driving unit 19 to drive the stripper 51 upward.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for winding and placing coils in the slots of a stator comprising
    an indexing conveyor,
    a plurality of placer heads carried by the conveyor at spaced intervals thereon, each placer head being adapted to hold coils for placement in the slots of a stator,
    means for indexing the conveyor successively to move each placer head to each of a series of winding stations and thence to a placing station,
    a coil winding and transfer mechanism at each winding station each comprising a coil form mounted in fixed position relative to said conveyor, means for winding a wire into a coil around the coil form, and means for transferring the coil from the coil form to the placer head at the respective winding station, and
    means at the placing station for pushing coils from the placer head at the placing station into the slots of a stator applied to that placer head.

2. Apparatus as set forth in claim 1 wherein each placer head is carried by the conveyor for indexing movement relative to the conveyor and wherein means is provided for effecting indexing movement of each placer head relative to the conveyor at each winding station.

3. Apparatus as set forth in claim 1 wherein said indexing conveyor comprises a rotary index table, said placer heads extending up from the table and being spaced at equal intervals around the table, said table being rotatable in steps corresponding to said intervals to index the placer heads from winding station to winding station and to the placing station, and the coil form of the coil winding and transfer mechanism at each winding station being mounted in vertical position above the table with its lower end above the upper ends of the placer heads.

4. Apparatus as set forth in claim 3 wherein the coil form at each winding station is a nonrotatable collapsible multistep coil form, with its lowest step the smallest step, and the coil winding and transfer mechanism at each winding station comprises a flyer rotatable around the coil form, and means for vertically traversing the flyer for winding a wire into a plurality of coils of different sizes around the coil form.

5. Apparatus as set forth in claim 4 wherein the coil winding and transfer mechanism at each winding station comprises means for reversibly rotating the flyer.

6. Apparatus as set forth in claim 4 wherein the coil winding and transfer mechanism at each winding station includes coil guide means movable down through the coil form into engagement with the placer head at the winding station, and coil stripper means for pushing the coil down off the coil form onto the placer head with the coil guided by said guide means.

7. Apparatus as set forth in claim 4 wherein each placer head comprises a circular series of fingers and is rotatable relative to the table about a vertical axis, and wherein means is provided for effecting indexing rotation of each placer head relative to the table at each winding station.

8. Apparatus as set forth in claim 7 wherein said means for effecting indexing rotation of each placer head comprises an indexing drive at each winding station, and means for disengageably coupling each placer head to the indexing drive at each winding station.

9. Apparatus for winding and placing coils in the slots of a stator comprising
    an index table rotary on a vertical axis;
    a plurality of placer heads each comprising a circular series of fingers extending up from the table spaced at equal intervals around the table, each placer head being adapted to hold coils for placement in the slots of a stator and being rotatably indexable relative to the table about the vertical axis of the circular series of fingers;
    means for rotatably indexing the table in steps corresponding to said intervals successively to move each placer head to each of a series of winding stations and thence to a placing station;
    a coil winding and transfer mechanism at each winding station each comprising a coil form mounted in fixed vertical position relative to the table above the table with its lower end above the upper ends of the placer heads, means for winding a wire into a coil around the coil form and means for transferring the coil to the placer head at the respective winding station;
    means for effecting indexing rotation of each placer head about its said vertical axis at each winding station;
    and means at the placing station for pushing coils from the placer head at the placing station into the slots of a stator applied to that placer head.

10. Apparatus as set forth in claim 9 wherein the coil form at each winding station is nonrotatable and the wire winding means comprises a flyer rotatable around the coil form.

11. Apparatus as set forth in claim 10 wherein the flyer is vertically movable for level winding the wire on the coil form.

12. Apparatus as set forth in claim 11 wherein means is provided for vertically moving the flyer to wind the wire into a single-turn-layer coil on the coil form.

13. Apparatus as set forth in claim 11 wherein means is provided for rotating the flyer in opposite directions around the coil form.

14. Apparatus as set forth in claim 13 wherein the coil transferring means of each coil winding and transfer mechanism comprises coil guide means movable down through the coil form into engagement with the placer head at the respective winding station and coil stripper means for pushing the coil down off the coil form onto the placer head with the coil guided by said guide means.

15. Apparatus as set forth in claim 14 wherein the coil winding and transfer mechanism at each winding station comprises a drum rotatable on a vertical axis carrying the flyer, a cylinder extending vertically in the drum, the coil form extending down from the lower end of the cylinder below the lower end of the drum, and epicyclic gear means for maintaining the cylinder against rotation in the drum.

16. Apparatus as set forth in claim 15 wherein the coil winding and transfer mechanism at each winding station comprises a wire guide movable from a winding position coaxial with the drum and above the drum to a retracted position, and means above the drum movable downward into the cylinder upon retraction of the wire guide for actuating the coil guide means and the coil stripper means.

17. Apparatus as set forth in claim 16 having means at each winding station for holding the wire in a favorable position for starting the winding of a coil on the coil form.

18. Apparatus as set forth in claim 17 having vertically movable wire clamping means at each winding station for clamping the reach of wire extending from the flyer to the coil form as the coil is transferred.

19. Apparatus as set forth in claim 18 having means at each winding station for pulling a lead of the wire after winding of a number of coils and means for cutting the wire after pulling of the lead.

20. Apparatus for winding and placing coils in the slots of a stator comprising
    an index table rotary on a vertical axis;
    a plurality of placer heads each comprising a circular series of fingers extending up from the table spaced at equal intervals around the table, each placer head being adapted to hold coils for placement in the slots of a stator and being rotatably indexable relative to the table about the vertical axis of the circular series of fingers;
    means for rotatably indexing the table in steps corresponding to said intervals for moving each placer head to a winding station and thence to a placing station;
    a coil winding and transfer mechanism at the winding station comprising a coil form mounted in fixed vertical position relative to the table above the table with its lower end above the upper ends of the placer heads, means for winding a wire around the coil form to form a plurality of coils of different sizes with the wire continuous between successive coils, and means for transferring the coils to the placer head at the winding station;
    means for effecting indexing rotation of each placer head about its said vertical axis at the winding station;
    and means at the placing station for pushing coils from the placer head at the placing station into the slots of a stator applied to that placer head.

21. Apparatus as set forth in claim 20 wherein the coil form is a nonrotatable collapsible multistep coil form with its lowest step the smallest step, wherein the wire winding means comprises a flyer rotatable around the coil form, the flyer being vertically movable, wherein means is provided for vertically moving the flyer to wind the wire into interconnected single-turn-layer coils on the coil form, wherein the coil transferring means of the coil winding and transfer mechanism comprises coil guide means movable down through the coil form into engagement with the placer head at the winding station and coil stripper means for pushing the coil down off the coil form onto the placer head with the coil guided by said guide means.

* * * * *